United States Patent
Palmer et al.

(10) Patent No.: US 11,033,809 B2
(45) Date of Patent: Jun. 15, 2021

(54) USING FINGER PRESENCE TO ACTIVATE A MOTION CONTROL FEATURE FOR A HANDHELD CONTROLLER

(71) Applicant: Valve Corporation, Bellevue, WA (US)

(72) Inventors: Austin Palmer, Seattle, WA (US); Ian Campbell, Seattle, WA (US); Scott Dalton, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/405,802

(22) Filed: May 7, 2019

(65) Prior Publication Data

US 2020/0353349 A1    Nov. 12, 2020

(51) Int. Cl.
| | |
|---|---|
| A63F 13/2145 | (2014.01) |
| G06F 3/0346 | (2013.01) |
| G06F 3/0338 | (2013.01) |
| G06F 3/044 | (2006.01) |
| A63F 13/24 | (2014.01) |

(52) U.S. Cl.
CPC ........ *A63F 13/2145* (2014.09); *A63F 13/24* (2014.09); *G06F 3/0338* (2013.01); *G06F 3/0346* (2013.01); *G06F 3/044* (2013.01); *G06F 2203/04108* (2013.01)

(58) Field of Classification Search
CPC ...... G06F 3/0338; G06F 3/0346; G06F 3/044; G06F 2203/04108
See application file for complete search history.

(56) References Cited

U.S. PATENT DOCUMENTS

| | | | |
|---|---|---|---|
| 2013/0100021 A1* | 4/2013 | Larsen | A63F 13/213 345/161 |
| 2015/0105152 A1* | 4/2015 | Bellinghausen | A63F 13/214 463/31 |
| 2017/0123516 A1* | 5/2017 | Li | G08C 23/04 |
| 2017/0189802 A1* | 7/2017 | Rogoza | A63F 13/24 |
| 2019/0018513 A1* | 1/2019 | Otagaki | H03K 17/975 |

OTHER PUBLICATIONS

PCT Search Report and Written Opinion dated Jun. 15, 2020 for PCT Application No. PCT/US2020/031779, 12 pages.

* cited by examiner

*Primary Examiner* — Md Saiful A Siddiqui
(74) *Attorney, Agent, or Firm* — Lee & Hayes, P.C.

(57) ABSTRACT

A handheld controller may include a movable control that is usable for activating and deactivating a motion control feature of the handheld controller based on a detection of, or a failure to detect, a finger contacting a surface of the movable control. For example, a touch sensor associated with the movable control may provide touch sensor data indicative of a proximity of a finger relative to the movable control, and based on this touch sensor data, the motion control feature of the handheld controller can be toggled on and off, depending on whether the finger is contacting the movable control or not. When the motion control feature is activated, motion sensor data from a motion sensor(s) is sent to an application (e.g., a video game) as application input. When the motion control feature is deactivated, the motion sensor data is not used as application input.

20 Claims, 9 Drawing Sheets

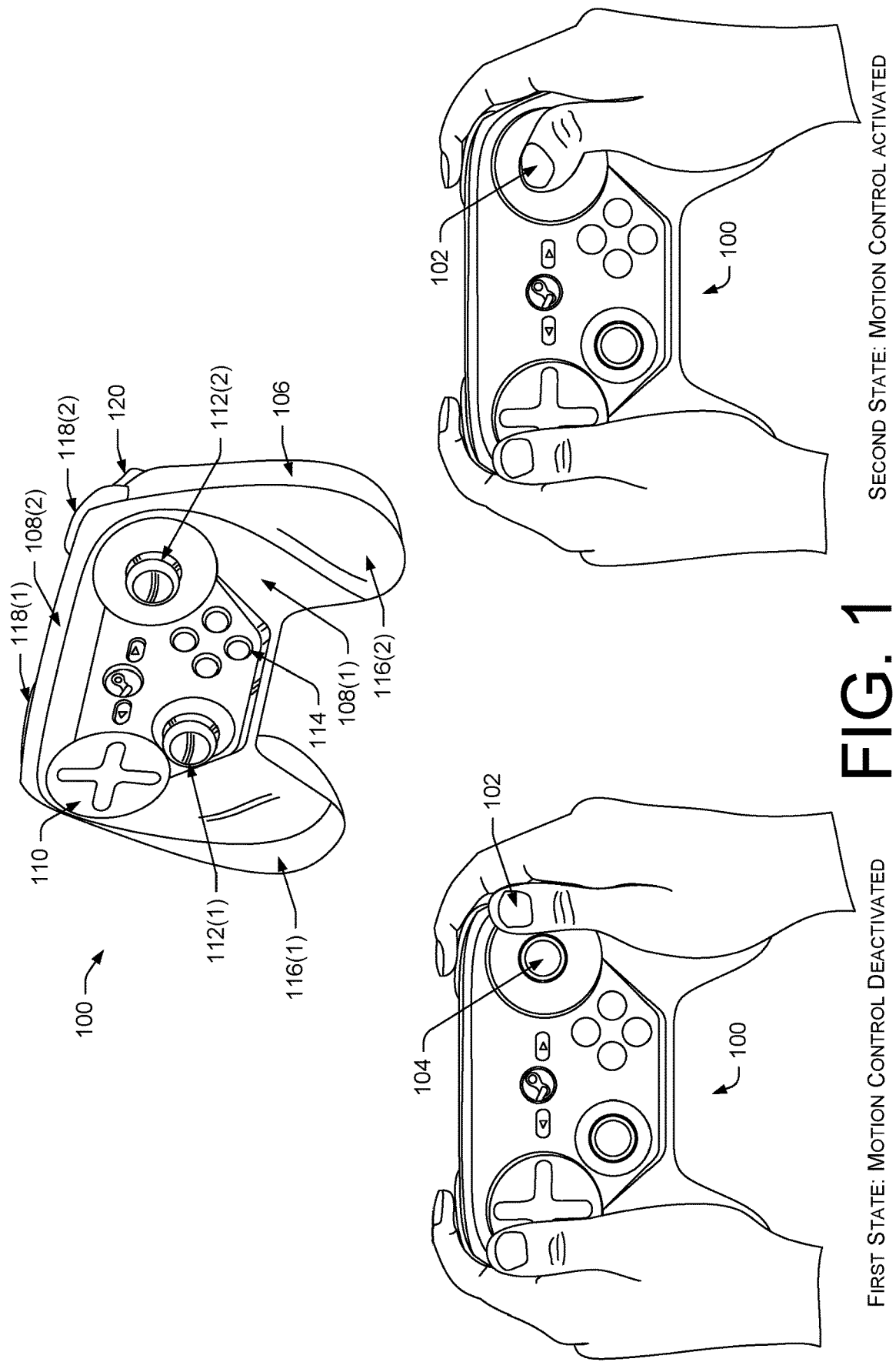

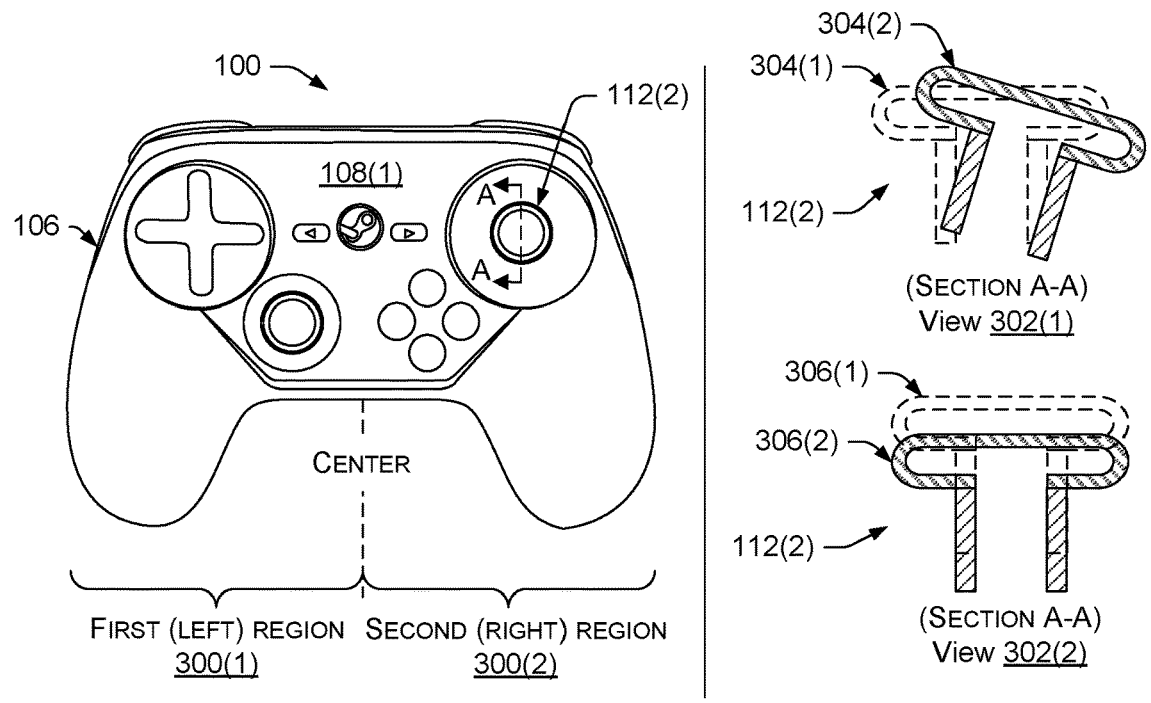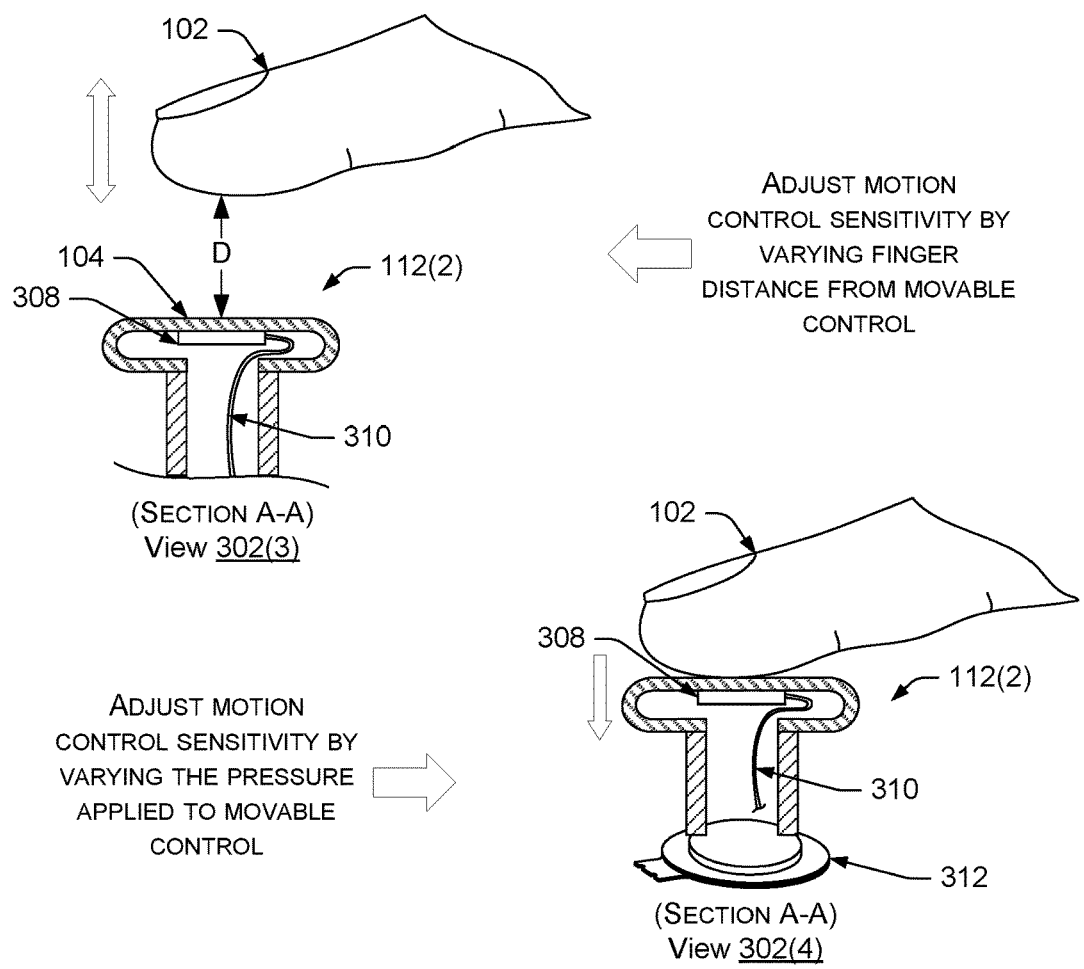
FIG. 3

USING FINGER PRESENCE TO ACTIVATE A MOTION CONTROL FEATURE FOR A HANDHELD CONTROLLER

BACKGROUND

Handheld controllers are used in an array of architectures for providing input, for example, to a computing device. For instance, handheld controllers are utilized in the gaming industry to allow players to interact with a personal computing device executing a gaming application, a game console, a game server, or the like. In addition to using one's fingers to actuate traditional controls provided on the game controller housing, some game controller designs have added a motion sensor (e.g., gyroscope and accelerometer) to enable a motion control feature that allows the user to provide video game input by moving the entire game controller in different directions (e.g., moving—such as by rotating, tilting, etc.—the game controller left, right, up, or down).

Despite early expectations that the addition of a motion control feature would enhance the playability of many video games, the user community has been largely underwhelmed by past attempts to implement such a motion control feature in game controllers. For example, past attempts have chosen to map gyroscope input to a rate of rotation in the video game, such as controlling the rate at which a virtual camera (e.g., the scene in a first-person shooter game) rotates based on the amount by which the user moves the game controller away from a so-called "dead zone" or centered position. With this particular implementation, it is very difficult for a user to prevent the virtual camera from rotating during gameplay because a user has to constantly inch the game controller around a small space in an attempt to find the dead zone where the camera rotation stops. In addition, motion sensors, such as gyroscopes and accelerometers, tend to drift over time, which means that the dead zone may drift during gameplay, which can create a situation where the user is required to hold the game controller at an awkward angle relative to his/her body in order to orient the virtual camera in a centered position. In order to address this issue, some past game controller designs have provided a dedicated "camera reset" button that the user can press to reset the virtual camera to a centered position, allowing the user to effectively recalibrate the motion sensor and return the game controller to a natural position in front of his/her body. However, requiring the user to remove a finger away from a primary control that is used frequently to provide primary video game input, and to use that finger to depress a dedicated camera reset button is an unneeded distraction that inhibits seamless gameplay.

In view of these and other considerations, many of today's video game developers choose to develop video games that lack support for a motion control feature, notwithstanding the availability of motion sensors that can be used in game controllers for motion control. The disclosure made herein is presented with respect to these and other considerations.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIG. 1 illustrates a perspective view of an example handheld controller, as well as a front view of a user holding the example handheld controller in two different states: a First State where a motion control feature is deactivated based on an absence of a finger on a movable control; and a Second State where the motion control feature is activated based on a presence of a finger on the movable control.

FIG. 3 shows a front view of the example handheld controller of FIG. 1, as well as examples of the movable control being moved between a first position and a second position, and also example techniques for adjusting the sensitivity of the motion control feature using a touch sensor associated with the movable control and/or a pressure sensor associated with the movable control.

DETAILED DESCRIPTION

Figure 2A:
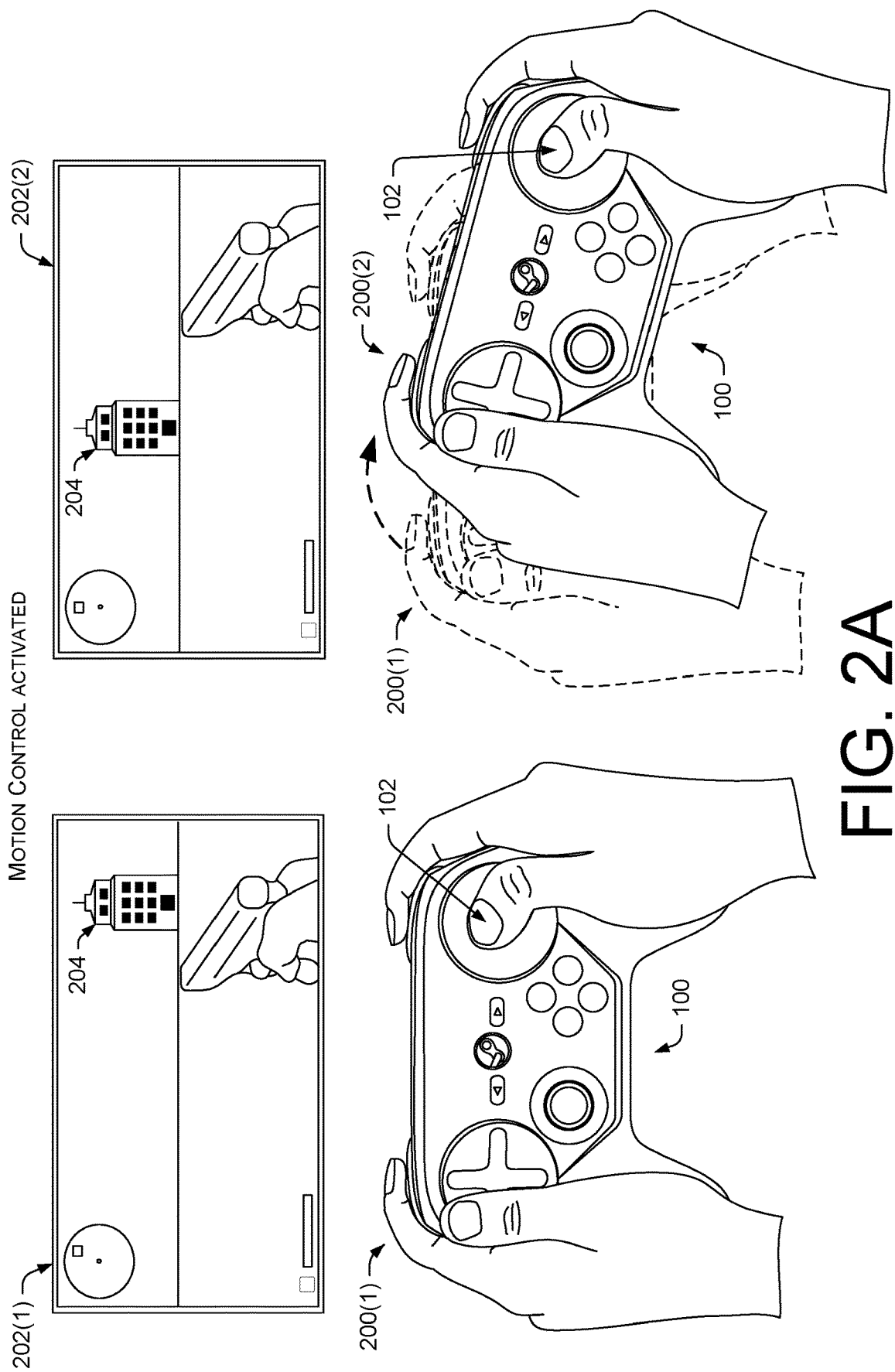
FIG. 2A illustrates a user moving the example handheld controller of FIG. 1 from a first pose to a second pose while a motion control feature is activated based on a presence of a finger on the surface of the movable control, and respective screen renderings between the two poses of the handheld controller to show how the motion control feature can be used to control an aspect of an application, such as a video game.

Described herein are, among other things, techniques and systems, including a handheld controller, for activating and deactivating a motion control feature of the handheld controller based on a detection of, or a failure to detect, a finger contacting a surface of a movable control included on a housing of the handheld controller. In some instances, a handheld controller, as described herein, may be used to control a computing device (e.g., a television, audio system, personal computing device, game console, etc.), to interact with an application (e.g., to engage in video game play, and/or the like). In some embodiments, this involves sending data to an application, such as a video game application, executing on the computing device. In some embodiments, the handheld controller may be part of a portable gaming device that includes an embedded display, in which case the portable device (e.g., a portable gaming device) may execute an application (e.g., a video game) that receives input from the handheld controller that is integrated into the portable device.

The handheld controller described herein may include one or more controls. These controls may include at least one movable control on a housing of the handheld controller. In some embodiments, the movable control is provided on a front surface of the housing, but it can be disposed anywhere on the housing. The movable control may include, without limitation, a joystick, a directional pad (D-pad), a trackball, a button, or any other type of movable control that is configured to be actuated by a finger moving the movable control from a first position to a second position.

The handheld controller may further include a touch sensor associated with the aforementioned movable control. The touch sensor may be configured to provide, to one or more processors of the handheld controller, touch sensor data indicative of a proximity of a finger relative to the movable control. The touch sensor may comprise a capacitive touch sensor, a resistive touch sensor, an infrared touch sensor, a touch sensor that utilizes acoustic soundwaves to detect a proximity of a finger relative to the touch sensor, or any other type of touch sensor. The handheld controller may further include a motion sensor configured to provide, to the processor(s), motion sensor data indicative of movement of the handheld controller. For example, the user can move the handheld controller in space (e.g., from a first pose to a second pose), and the motion sensor can generate motion sensor data indicative of this movement.

A motion control feature can be activated (enabled) and deactivated (disabled) on-demand by the user of the handheld controller during use (e.g., during gameplay) by touching the movable control with a finger and removing the finger therefrom, or vice versa. When the motion control feature is activated, logic of the handheld controller may send the motion sensor data (provided by the motion sensor) to an application, such as a video game, as application (e.g., video game) input to control an aspect of the application. For example, a user may control the movement of a cursor of the application. As another example, a user may control the movement of a virtual object of the application by moving the handheld controller within a physical environment (e.g., by tilting the handheld controller left or right to steer a virtual race car in a racing video game). As yet another example, a user may control the movement of a player-controlled character (e.g., in a first-person shooter game) whereby a virtual camera representing the view of a virtual world—as seen by the player-controlled character—can be moved, causing the scene that is presented on a display to change during use (e.g., during gameplay) based on the movement of the handheld controller. These are merely example aspects of applications, including video games, that can be controlled via the motion control feature (e.g., through movement of the handheld controller), and this disclosure is not limited to these particular examples.

In order to toggle the motion control feature on and off (e.g., from an activated state to a deactivated state) during use (e.g., during gameplay), the user may contact a surface of the movable control with a finger. For example, the user can touch a surface of the movable control with a finger, and the touch sensor associated with the movable control can detect the presence of the user's finger on the movable control, even when the user is not actuating (e.g., deflecting, depressing, etc.) the movable control. Logic of the handheld control may then determine, based at least in part on touch sensor data provided by the touch sensor, whether a finger is contacting the surface of the movable control, and, based on this determination, the motion control feature can be activated. When the motion control feature is activated, motion sensor data provided by the motion sensor(s) may be sent to the application (e.g., the video game) as application input (e.g., video game input) to control an aspect of the application. By contrast, when the motion control feature is deactivated, the motion sensor data may not be sent to the application as application input, the motion sensor data may not be generated at all, or the motion sensor data may be sent but ignored by a component receiving the motion sensor data. It is also to be appreciated that there may be instances where the motion sensor data is not sent to the application notwithstanding the motion control feature being activated.

By activating/deactivating the motion control feature of the handheld controller based on the presence/absence of a finger on a surface of a movable control, a user can seamlessly provide motion control input during use (e.g., during gameplay) using a movable control that doubles as an application input (e.g., video game input) control. That is, the movable control may be actuated as a primary control during use (e.g., during gameplay), and the movable control may also function as toggle control to activate and deactivate the motion control feature based on a presence of a finger on the surface of the movable control. Much like the experience of playing video games on a personal computer (PC) with a mouse and keyboard, the user can "ratchet" the movement of the virtual camera or the virtual object of a video game by contacting the surface of the movable control with a finger and moving the handheld controller in a first direction with the finger contacting the surface of the movable control, then removing the finger from the surface of the movable control and moving the handheld controller in a second, opposite direction with the finger removed, and repeating this controller operation/movement, as desired to control the movement of the virtual camera or the virtual object in a ratcheting manner. This is analogous to how a user would move a mouse across the surface of a mouse pad in a first direction, then lift the mouse up and move the mouse in a second, opposite direction, and then set the mouse back down on the mouse pad to iterate the movement in a particular (first) direction. This familiar type of video game input makes for a user-friendly implementation of a motion control feature in a handheld controller.

Also described herein are techniques and systems for adjusting the sensitivity of the motion control feature on-the-fly using either or both of the touch sensor associated with the movable control and/or a pressure sensor associated with the movable control. For example, the touch sensor and/or the pressure sensor may allow the user to control an amount (or degree) of movement of a cursor, a virtual camera, or a virtual object of the application (e.g., video game) by lifting his/her finger off of the surface of the movable control a little bit (e.g., by hovering the finger at a distance from the movable control that is still within a threshold distance) and/or by applying varying amounts of force to the movable control (e.g., by pressing down upon the movable control). These real-time control features may allow the user to provide more accurate application input (e.g., video game input) and/or improve their gameplay performance.

FIG. 1 illustrates a perspective view of an example handheld controller 100, as well as a front view of a user holding the example handheld controller 100 in two different states: a First State where a motion control feature is deactivated based on an absence of a finger 102 on a surface 104 of a movable control; and a Second State where the motion control feature is activated based on a presence of a finger 102 on the surface 104 of the movable control.

As illustrated, the handheld controller 100 includes a housing 106. The housing 106 has a front surface 108(1), a top surface 108(2), a back surface opposite the front surface 108(1), and a bottom surface opposite the top surface 108(2). The front surface 108(1) may include one or more front-surface controls that are, in some instances, controllable by one or thumbs of a user operating the handheld controller 100. As used herein, a "finger" can mean any finger (including the thumb) on a hand of a user. As such, a "finger," as used herein, may include any of an index finger, a middle finger, a ring finger, a pinky finger, or a thumb of the user. Although the user can use any finger(s) to operate individual ones of the front-surface controls, a common manner of providing input to the example controller shown in FIG. 1 is by operating individual ones of the front-surface controls using the left thumb or the right thumb.

The front-surface controls may include, without limitation, one or more trackpads, trackballs, joysticks, buttons, directional pads (D-pads), or the like. In the example of FIG. 1, the front surface 108(1) of the housing 106 includes a trackpad 110 that includes an outline of a D-pad. In this manner, the trackpad 110 may be used as an omnidirectional D-pad and is controllable by a left thumb of a user. The trackpad 110 may or may not include actuating buttons/switches at locations that correspond to up, down, left, and right of the D-pad outline. The front surface 108(1) may also include a first (e.g., left) joystick 112(1) and a second (e.g., right) joystick 112(2). The first joystick 112(1) may be controllable by a left thumb of the user, while the second joystick 112(2) may be controllable by a right thumb of the user. In addition, the front surface 108(1) includes depressible buttons 114 (e.g., X, Y, A, and B) that are controllable by a right thumb of the user. In this example, the handheld controller 100 also includes a left grip 116(1) and a right grip 116(2) by which a user may hold the controller 100 via right and left hands of the user, respectively.

The top surface 108(2), meanwhile, may include one or more top-surface controls. In the illustrated example, the controller 100 includes a left top-surface control 118(1) and a right top-surface control 118(2). The left top-surface control 118(1) may be operable by a left finger (e.g., index finger) of the user, while the right top-surface control 118(2) may be operable by a right finger (e.g., index finger) of the user. The top-surface controls 118(1) and 118(2) may sometimes be referred to as "bumpers." The top-surface controls may further include one or more triggers 120, which may be operable by fingers (e.g., middle fingers) of the user. In some cases, controls similar to the top-surface controls 118 and/or 120 may be provided on the back surface of the handheld controller 100. Additional controls may be provided on the back surface of the handheld controller 100 as well, such as one or more paddles, one or more additional trackpads, or any other types of input control. It is to be appreciated that the shape of the controller is exemplary, and that a controller with a different shape (e.g., rectangular, much like a traditional television remote control, circular, etc.) can be used for the handheld controller 100 with at least some similar surfaces to those described with respect to the example handheld controller 100. In addition, it is to be appreciated that the example front-surface controls and top-surface controls can be replaced with different types of controls. For instance, the second (e.g., right) joystick 112(2) can be replaced with a D-pad, a button, a trackball, or the like, the depressible buttons 114 may be replaced with a D-pad, a joystick, a trackball, or the like, and so on.

The second (e.g., right) joystick 112(2) is an example of a "movable control," as described herein, which can be utilized to toggle a motion control feature on and off during use (e.g., during gameplay). Although other types of controls besides a joystick are contemplated for such a movable control that is usable to toggle the motion control feature on/off, various embodiments are described herein with reference to the joystick 112(2) as an example of such a movable control. Accordingly, it is to be appreciated that any reference to "joystick 112(2)" herein can be used interchangeably with other types of movable controls, such as a D-pad, a trackball, a depressible button, etc. The use of the second (e.g., right) joystick 112(2) as a motion control activation mechanism is convenient for the user in the sense that the second (e.g., right) joystick 112(2) is often used for an aiming control (sometimes referred to as a "look" control) of a first-person shooter video game, and the user's finger 102 can be readily placed upon, or removed from, the joystick 112(2) with minimal effort (both mentally and physically) on the part of the user. It is more-or-less second nature for the user to keep the right thumb near the right joystick 112(2) so that it can be quickly placed on the joystick 112(2) to operate the joystick 112(2), as desired, and/or to toggle the motion control feature on and off. It is also to be appreciated that, although the joystick 112(2) is provided on the front surface 108(1), a movable control that is disposed anywhere on the housing 106 can be used to toggle the motion control feature on/off, such as a movable control provided on the top surface 108(2) or the back surface where a finger is conveniently positioned. It is also to be appreciated that non-movable controls can be utilized to toggle the motion control feature on and off during use (e.g., during gameplay). For example, the second (e.g., right) joystick 112(2) can be replaced with a touch sensitive surface (e.g., a trackpad) that does not move between multiple positions. This non-movable, stationary control may be associated with a touch sensor to detect the presence or absence of a finger on a surface of a non-movable control to determine whether to toggle the motion control feature on or off during use (e.g., during gameplay).

As shown in FIG. 1, the user can activate (or enable) a motion control feature by touching the surface 104 (e.g., a distal surface) of the joystick 112(2) with a finger 102 (e.g., a right thumb), and the user can deactivate (or disable) the motion control feature by removing the finger 102 from the surface 104 of the joystick 112(2), or vice versa. That is, the motion control feature can be activated "on-touch" of the joystick 112(2), or it can be deactivated "on-touch" of the joystick 112(2). Many of the examples described herein are directed to a configuration where the motion control feature is activated on-touch of the joystick 112(2), as shown in the example of FIG. 1, whereby a finger contacting the surface 104 of the joystick 112(2) activates the motion control feature, as shown in the Second State of FIG. 1.

The joystick 112(2) may have a touch sensor associated therewith (e.g., mounted to an inner surface of the joystick 112(2) underneath the surface 104). The touch sensor is configured to detect the proximity of a finger 102 relative to the joystick 112(2). For example, the touch sensor may provide, to one or more processors of the handheld controller 100, touch sensor data indicative of the proximity of the finger 102 relative to the joystick 112(2). In some embodiments, the touch sensor associated with the joystick 112(2) may comprises a capacitive sensor(s) configured to measure capacitance values based on the proximity of the finger 102 relative to the joystick 112(2). As such, when the finger 102 moves closer to the joystick 112(2), the touch sensor may provide, as output, relatively high capacitance values. When the finger 102 moves farther away from the joystick 112(2), the touch sensor may provide, as output, relatively low capacitance values. In this manner, based on the touch sensor data provided by the touch sensor, logic of the handheld controller 100 can determine if and when the finger 102 is contacting the surface 104 of the joystick 112(2), with reasonably high confidence. Threshold values may be utilized to determine a finger contact event, such as by determining that the finger 102 is contacting the surface 104 if a digitized proximity value (based on the touch sensor data) exceeds a threshold value. In some instances, the touch sensor associated with the joystick 112(2) comprises one or more capacitive pads that span some or substantially all of the surface 104 (e.g., surface area).

In the First State (shown in FIG. 1), the finger 102 is next to the joystick 112(2), but the finger 102 is not hovering over or contacting the surface 104 of the joystick 112(2). As such, in the First State, the touch sensor data provide by the touch sensor may be indicative of the finger 102 not contacting the surface 104 of the joystick 112(2). In general, a motion sensor(s) (described in more detail below) of the handheld controller 100 may provide motion sensor data based on movement of the handheld controller 100, but, in the First State, based on the touch sensor data indicating that the finger 102 is not contacting the surface 104 of the joystick 112(2), the motion control feature of the handheld controller 100 may be deactivated (or disabled), meaning that the motion sensor data may not sent to an application (e.g., a video game) as application input (e.g., video game input). In this manner, when the motion control feature is deactivated, movement of the handheld controller 100 does not have any effect on the application (e.g., the motion sensor data is not used as application input to control an aspect of the application). In some embodiments, when the motion control feature is deactivated, the motion sensor(s) may not even generate motion sensor data notwithstanding movement of the handheld controller 100, such as by failing to supply power to the motion sensor(s) unless and until the finger 102 makes contact with the surface 104 of the joystick 112(2). In other embodiments, the motion sensor data is still generated (and possibly sent to a receiving component) when the motion control feature is deactivated, but the motion sensor data can be ignored in terms of using it to control of an aspect of an executing application, such as a video game. In the latter scenario, the motion sensor data may still be used for other purposes, such as for power management logic using motion to wake up the handheld controller 100, or other non-application input (e.g., non-video game input) purposes.

In the Second State (shown in FIG. 1), the user has positioned a finger 102 (e.g., the right thumb) so that the finger 102 is in contact with the surface 104 of the joystick 112(2). The touch sensor data provided by the touch sensor may be indicative of the finger 102 contacting the surface 104 of the joystick 112(2) in the Second State, and, as a result, the motion control feature of the handheld controller 100 may be activated (or enabled). When the motion control feature is activated in the Second State, the motion sensor(s) of the handheld controller 100 may send motion sensor data to an application (e.g., a video game) as application input (e.g., video game input) to control an aspect of the application. An example of controlling an aspect of an application in the form of a video game is shown in FIGS. 2A and 2B.

FIG. 2A illustrates a user moving the example handheld controller 100 of FIG. 1 from a first pose 200(1) to a second pose 200(2) while contacting the surface 104 of the joystick 112(2) with a finger 102. In this manner, a motion control feature is activated during movement of the handheld controller 100. FIG. 2A also shows respective screen renderings 202(1) and 202(2) that may be presented on a display between the two poses 200(1) and 200(2). This shows how the motion control feature can be used to control an aspect of a video game. In the example of FIG. 2A, the motion control feature of the handheld controller 100 is usable to control movement of a virtual camera of the video game (e.g., first-person shooter game). In this scenario, movement of the virtual camera changes a scene that is presented on a display because the virtual camera represents a view of a virtual world, as seen be the player-controlled character of the video game. In the first screen rendering 202(1), the virtual camera of the video game is oriented so that a virtual building 204 is visible in the scene towards a righthand side of the screen rendering 202(1). The user is holding the handheld controller 100 in the first pose 200(1) at a time when the first screen rendering 202(1) is presented on a display.

With the finger 102 touching the surface 104 of the joystick 112(2), as soon as the user moves the handheld controller 100 from the first pose 200(1) to the second pose 200(2) (e.g., by moving the controller 100 in a rightward motion), the motion sensor(s) of the controller 100 generates motion sensor data indicative of this movement. Because the user's finger 102 is contacting the surface 104 of the joystick 112(2), as detected by a corresponding touch sensor, the motion control feature is activated, and this motion sensor data is sent to the video game as video game input to control the movement of the virtual camera, in this example. In the illustrative example of FIG. 2A, the rightward movement of the handheld controller 100 maps to a rightward movement of the virtual camera. Consider a scenario where the movement of the controller 100 from the first pose 200(1) to the second pose 200(2) is predominantly a rotational movement of 30 degrees, the virtual camera of the video game may be moved by a proportional amount (e.g., the virtual camera may rotate in the rightward direction by an amount of roughly 30 degrees, or by another amount that is proportional to the amount of movement of the handheld controller 100 (e.g., by applying a scale factor to the amount of movement detected by the motion sensor(s) of the controller 100). The second screen rendering 202(2) shows how the scene changes based on the detected movement of the handheld controller 100 because the virtual building 204 is now in the center of the field of view in the second screen rendering 202(2) due to the rightward movement of the virtual camera. As described herein, other aspects of the video game can be controlled based on the movement of the handheld controller 100, such as by controlling the movement of a virtual object (e.g., steering a virtual racecar), or the like.

Figure 2B:
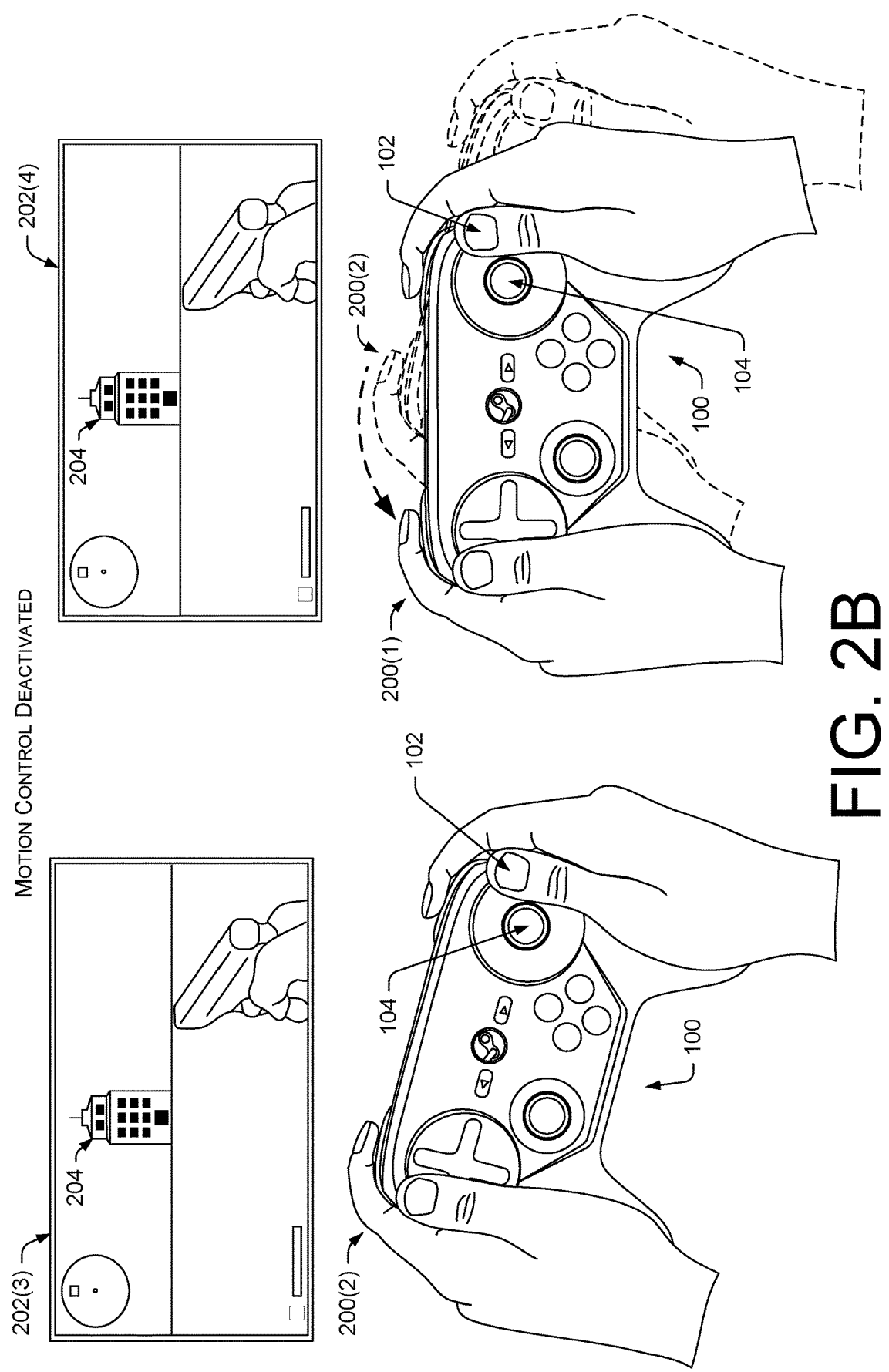
FIG. 2B illustrates a user moving the example handheld controller of FIG. 1 from the second pose back to the first pose while the motion control feature is deactivated based on an absence of a finger on the surface of the movable control, and respective screen renderings between the two poses of the handheld controller to show how the motion control feature can be deactivated so that movement of the handheld controller does not control an aspect of an application, such as a video game.

Contrasting FIG. 2B with FIG. 2A, if the user moves the handheld controller 100 while the user's finger 102 is not contacting the surface 104 of the joystick 112(2), the motion control feature is deactivated during the movement of the controller 100, and, as a result, a third screen rendering 202(3) and a fourth screen rendering 202(4) might present the same scene between the two poses 200(2) and 200(1) of the handheld controller 100. This is because, in the example of FIG. 2B, the motion control feature, when activated, controls movement of the virtual camera of the video game, and, because the motion control feature is deactivated in FIG. 2B, the virtual camera of the video game does not move, notwithstanding the movement of the handheld controller 100. Specifically, as shown in FIG. 2B, the user may move the handheld controller 100 from the second pose 200(2) back to the first pose 200(1) (e.g., by moving the controller 100 in a leftward motion) without touching the joystick 112(2) with a finger. Even though the motion sensor(s) of the controller 100 may generate motion sensor data indicative of this movement of the handheld controller 100, because the user's finger 102 is not contacting the surface 104 of the joystick 112(2), as detected by a corresponding touch sensor, the motion control feature is deactivated, which means that the motion sensor data provided by the motion sensor(s) can be ignored (e.g., the motion sensor data is not sent to the video game as video game input, not generated at all, or sent but ignored).

Thus, between FIGS. 2A and 2B, a "ratcheting" mechanism is illustrated whereby the user can rotate the virtual camera of the video game, for example, as shown in FIG. 2A while touching the surface 104 of the joystick 112(2), and then remove the finger 102 from the joystick 112(2), move the handheld controller 100 as shown in FIG. 2B without affecting the virtual camera, and then the user may again touch the surface 104 of the joystick 112(2) while moving the handheld controller 100 to iterate the movement of the virtual camera in a particular direction. Using this technique, the user can, for instance, rotate 360 degrees by "ratcheting" the handheld controller 100 in the right and left directions while iteratively lifting the finger 102 off of the surface 104 of the joystick 112(2) (as shown in FIGS. 2A and 2B). In this manner, the user can look in any and all directions within the virtual world of the video game using the ratcheted controller 100 movement described herein. This style of user input is familiar to PC gamers who are accustomed to using a mouse and a keyboard to play video games, such as first-person shooter games.

FIG. 3 shows, in part, a front view of the example handheld controller 100 of FIG. 1. In the front view of the handheld controller 100 of FIG. 3, the front surface 108(1) of the housing 106 is shown with reference to a first (e.g., left) region 300(1) left of center of the handheld controller 100 and a second (e.g., right) region 300(2) right of center of the handheld controller 100. In the example of FIG. 3, the joystick 112(2) is disposed on the front surface 108(1) of the housing 106 within the second region 300(2) (e.g., on the right half of the handheld controller 100). This is merely an example of a position where a movable control can be located for toggling the motion control feature on/off, and it is to be appreciated that any other type of movable control can be implemented in place of the joystick 112(2) to activate/deactivate the motion control feature as described herein, and such a movable control can be located anywhere on the housing 106, such as on the front surface 108(1) within the first region 300(1) (e.g., on the left half of the handheld controller 100), or on a different surface of the handheld controller 100 other than the front surface 108(1).

FIG. 3 also shows cross-sectional views 302(1)-(4) of the joystick 112(2) taken along Section A-A. The cross-sectional views 302(1) and 302(2) show how the joystick 112(2) is movable between a first position and a second position. In the cross-sectional view 302(1) of FIG. 3, the joystick 112(2) is shown as being deflectable between a first position 304(1) (e.g., an upright position) and a second position 304(2) (e.g., a deflected position). This may be accomplished by the user deflecting the joystick 112(2) in any direction (e.g., up, down, left, right, or any direction in between) from center using a finger 102. In response to actuating the joystick 112(2) in this manner, the logic of the handheld controller 100 may send actuation data to an executing application (e.g., a video game) as application input (e.g., video game input). This actuation data may control the same aspect of the video game that is controlled by the motion sensor data when the motion control feature is activated. Alternatively, the actuation data may control a different aspect of the application (e.g., the video game) than the aspect of the application (e.g., the video game) that is controlled by the motion sensor data when the motion control feature is activated. In the former example where actuation of the joystick 112(2) and the movement of the handheld controller 100 control a common aspect of the application (e.g., the video game), the joystick 112(2) may control gross movement whereas the movement of the handheld controller 100 may control fine movement, or vise versa. For example, the user may deflect the joystick 112(2) in different directions to control the virtual camera of a first-person shooter game (e.g., orient the player-controlled character in a desired direction). In this scenario, deflection of the joystick causes movement of a virtual camera of the video game (e.g., to change where the player-controlled character is looking in the virtual world). Subsequently, the user may activate the motion control feature (if it is not already activated), and may move the handheld controller 100 with the motion control feature activated to make fine-tuned adjustments to the orientation of the virtual camera (e.g., to aim a weapon). In this example scenario, the same aspect of the video game is controllable with two different input mechanisms, a first input mechanism being the deflection of the joystick 112(2), and a second input mechanism being movement of the handheld controller 100, as detected by the motion sensor(s) of the controller 100 with the motion control feature activated. In other examples, the actuation of the joystick 112(2) may control a different aspect of the video game, such as choosing different weapons, or some other aspect of the video game.

The cross-sectional view 302(2) of FIG. 3 shows another type of movement that the joystick 112(2) may exhibit. In this case, the joystick 112 is shown as being depressible between a first position 306(1) (e.g., an extended position) and a second position 306(2) (e.g., a depressed position). This may be accomplished by the user pressing upon the joystick 112(2) in a direction that is orthogonal to the front surface 108(1) of the housing 106. In either actuation scenario between cross-sectional views 302(1) and 302(2), the movement of the joystick 112(2) may be detected by a switch, a potentiometer, or any similar mechanism that can detect actuation of the joystick 112(2). This movement of the joystick 112(2) can be translated or converted into actuation data that is usable to control some aspect of the application (e.g., the video game).

With reference to cross-sectional views 302(3) and 302(4), example techniques for adjusting the sensitivity of the motion control feature are shown. In both of the cross-sectional views 302(3) and 302(4), a touch sensor 308 is associated with the joystick 112(2) in that the touch sensor(s) 308 may be mounted underneath a surface 104 (e.g., a distal surface) of the joystick 112(2) where a finger 102 can contact the joystick 112(2). In some embodiments, the touch sensor 308 is a capacitive sensor (e.g., a capacitive pad) adhered or otherwise attached to an inner surface of the joystick 112(2) underneath a distal surface (e.g., the surface 104). In some embodiments, the capacitive pad may be adhered to the outer surface 104 of the joystick 112(2), or embedded somewhere within a distal portion of the joystick 112(2). The touch sensor 308 (e.g., a capacitive sensor) may be electrically coupled to suitable electronics (e.g., one or more processors) on a printed circuit board (PCB) within the handheld controller 100 via a flex circuit 310. In some embodiments, a wireless electronic coupling may be utilized in lieu of a physical flex circuit 310. A flex circuit 310 provides a robust electronic connection to electronics of the handheld controller 100 and is generally free from interference. Although a capacitive-type touch sensor 308 is described by way of example herein, in other instances, the touch sensor(s) 308 can be based on other touch-sensing technologies, such as a resistive touch sensor, an infrared touch sensor, a touch sensor that utilizes acoustic soundwaves to detect a proximity of a finger 102, or any other type of touch sensor.

As shown in the cross-sectional view 302(3), a finger 102 of the user (e.g., a thumb) may be spaced a distance, D, from the surface 104 of the joystick 112(2), and the touch sensor 308 may generate touch sensor data indicative of this proximate finger 102. For instance, in implementations that utilize capacitive-based sensing, the touch sensor 308 may include electrodes (e.g., a transmitter electrode and a receiver electrode of a transcapacitive-type sensor), and voltage can be applied to the electrodes so that the electrodes are configured to measure capacitance changes at the electrodes, which can be translated into touch sensor data. Capacitance changes at the electrodes of the touch sensor 308 may be influenced by an object (such as the finger 102) that is in proximity to the electrodes. The sensitivity of the touch sensor 308 itself can be adjusted (e.g., at a time of manufacture) so that the finger 102 in proximity, but not in contact with, the joystick 112(2) is detectable by the touch sensor 308. In this case, the touch sensor data provided by the touch sensor 308 can be converted to digitized proximity values (e.g., digitized capacitance values) that may be indicative of a proximity of the finger 102 relative to the surface 104 of the joystick 112(2). For instance, if the finger 102 is touching the surface 104 of the joystick 112(2), this may be indicated by digitized proximity values that exceed a threshold value. If the finger 102 is close to, but not touching, the surface 104, as shown in the cross-sectional view 302(3), this may be indicated by digitized proximity values that are within a range of values below the threshold value indicative of the finger 102 contacting the surface 104.

To illustrate a first sensitivity adjustment technique, a user may touch the surface 104 of the joystick 112(2) with his/her finger 102, and the motion control feature, as described herein, may be activated as a result of detecting this contact with the joystick 112(2) via the touch sensor 308. In this state (e.g., when the finger 102 is contacting the surface 104 of the joystick 112(2)), the motion control feature may be set to a first sensitivity level that corresponds to a first amount of movement of the cursor, a first amount of movement of the virtual camera, or a first amount of movement of a virtual object of the application (e.g., the video game). For instance, while the user is touching the surface 104 of the joystick 112(2) with his/her finger 102, a 30 degree rotation of the handheld controller 100 in a rightward direction may correspond to a 30 degree rotation of the cursor, the virtual camera, or a virtual object of the application (e.g., the video game).

Subsequently, the touch sensor data provided by the touch sensor 308 may indicate that the finger 102 has ceased contacting the surface 104 of the joystick 112(2) and remains spaced a distance, D, from the surface 104 of the joystick 112(2), where D is less than a threshold distance. In response to the finger 102 lifting off of the joystick 112(2) in this manner, the sensitivity level of the motion control feature can be adjusted to a second sensitivity level that corresponds to a second amount of movement of the cursor, a second amount of movement of the virtual camera, or a second amount of movement of the virtual object of the application (e.g., the video game). For instance, based on the finger 102 changing from being in contact with the surface 104 to being spaced a distance, D, from the surface 104 of the joystick 112(2), a 30 degree rotation of the handheld controller 100 in a rightward direction may correspond to a reduced 15 degree rotation of the cursor, the virtual camera, or the virtual object of the application (e.g., the video game). In other words, the user can touch the joystick 112(2) to activate the motion control feature, and then the user can adjust the sensitivity of the motion control feature by lifting the finger off of the joystick 112(2) by an amount that is less than a threshold distance. Moving the finger 102 to a distance from the surface 104 that exceeds this threshold distance may deactivate the motion control feature, while maintaining the finger 102 at a distance from the surface 104 that is less than this threshold distance may keep the motion control feature activated at a reduced sensitivity level. Accordingly, the user can move the finger 102 closer to, or farther from, the joystick 112(2) to adjust the sensitivity (up or down) in real-time. As mentioned, in this embodiment, a threshold distance may be monitored to deactivate the motion control feature if the finger 102 moves beyond the threshold distance. If, after moving beyond the threshold distance, the finger 102 moves within the threshold distance from the joystick 112(2) again, but without contacting the surface 104, the motion control feature may not be activated because activation of the motion control feature may be based on the finger 102 contacting the surface 104 of the joystick, as detected by the touch sensor 308.

Another manner of adjusting the sensitivity of the motion control feature is shown in the cross-sectional view 302(4). In this example, a pressure sensor 312 may be associated with the joystick 112(2) by virtue of the pressure sensor 312 being mounted on a planar surface of a structure within the housing 106 that is positioned underneath the joystick 112(2). An example of the pressure sensor 312 is force sensing resistor (FSR), although other types of pressure sensing mechanisms can be utilized for the pressure sensor 312, such as piezoelectric sensors, strain gauges, and the like. As such, the pressure sensor 312 is configured to measure force data, such as force data in the form of a resistance value that corresponds to an amount of force applied to the joystick 112(2), such as by the finger 102 pressing down on the surface 104 in a direction orthogonal to the front surface 108(1) (or another surface) of the housing 106 where the joystick 112(2) is provided. A pressure sensor 312 in the form of a FSR may include multiple substrates (e.g., a substrate of conductive material and a resistive membrane) separated by a space. The FSR can translate a press on the joystick 112(2) (a measured resistance value) into a digitized FSR value that is usable to adjust the sensitivity of the motion control feature. For instance, while the user is touching the surface 104 of the joystick 112(2) with his/her finger 102, the user may be applying little to no pressure on the joystick 112(2), and the sensitivity level of the motion control feature may be such that a 30 degree rotation of the handheld controller 100 in a rightward direction may correspond to a 30 degree rotation of the cursor, the virtual camera, or a virtual object of the application (e.g., the video game).

Subsequently, the force data provided by the pressure sensor 312 may indicate that the finger 102 has changed from contacting the surface 104 of the joystick 112(2)

without pressing on the joystick 112(2) to applying a discernable amount of force to the joystick 112(2). Because FSRs tend to exhibit a small amount of noise (e.g., they tend to output a positive resistance value even when nothing is pressing upon the FSR), the logic of the handheld controller 100 may be configured to monitor a threshold value above the "noise floor" of the pressure sensor 312 in the form of a FSR to determine when the user has pressed upon the joystick 112(2). Therefore, for FSR values above a threshold FSR value, the logic may determine that the user is pressing upon the joystick 112(2) with an amount of force that varies with the FSR output, as exhibited on a FSR response curve. Accordingly, in response to the user pressing upon the joystick 112(2), the sensitivity level of the motion control feature can be adjusted to a second sensitivity level that corresponds to a second amount of movement of the cursor, a second amount of movement of the virtual camera, or a second amount of movement of the virtual object of the application (e.g., the video game). For instance, based on the finger 102 changing from being in contact with the surface 104 without pressing on the joystick 112(2) to pressing upon the joystick 112(2) with a discernable amount of force, a 30 degree rotation of the handheld controller 100 in a rightward direction may correspond to a reduced 15 degree rotation of the cursor, the virtual camera, or the virtual object of the application (e.g., the video game). In other words, the user can touch the joystick 112(2) to activate the motion control feature, and then adjust the sensitivity of the motion control feature by pressing harder upon the joystick 112(2).

Like the touch sensor 308, the pressure sensor 312 may be electrically coupled to electronics on a PCB within the housing 106 of the handheld controller 100, such as via another flex circuit. In this manner, the pressure sensor 312 can provide force data (e.g., resistance values) to a processor(s) of the handheld controller 100, which may be digitized and interpreted by logic of the handheld controller 100 in accordance with the techniques described herein.

The processes described herein are illustrated as a collection of blocks in a logical flow graph, which represent a sequence of operations that can be implemented in hardware, software, firmware, or a combination thereof (referred to herein as "logic"). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
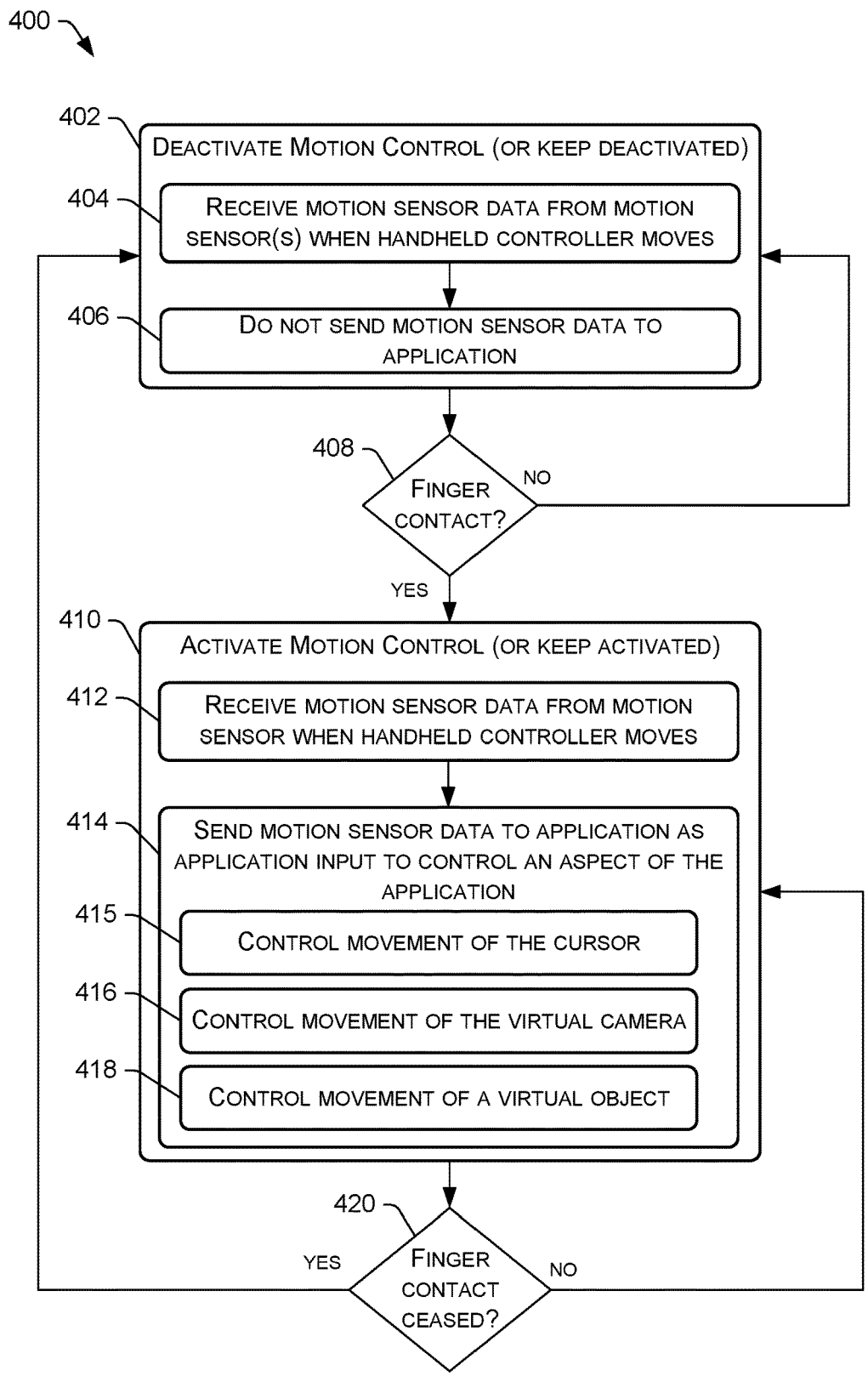
FIG. 4 is a flow diagram of an example process for activating and deactivating a motion control feature based on a presence or an absence of a finger on a surface of a movable (or non-movable) control of a handheld controller.

FIG. 4 is a flow diagram of an example process 400 for activating and deactivating a motion control feature based on a presence or an absence of a finger on a surface of a movable (or non-movable) control of a handheld controller 100. For discussion purposes, the process 400 is described with reference to the previous figures.

At 402, a motion control feature of a handheld controller 100 may be deactivated. This may represent an initial state of the handheld controller 100, such as when the handheld controller 100 is powered on for the first time. In the example process 400, this may also be based on the absence of a finger 102 on a surface 104 of a movable control (e.g., the joystick 112(2)) provided on a housing 106 of the handheld controller 100. That is, the motion control feature may be deactivated (or disabled) when the user is not touching the surface 104 of the movable control. In some embodiments, the motion control feature may be deactivated based on the absence of a finger 102 on a surface of a non-movable control (e.g., a trackpad) provided on the housing 106 of the handheld controller 100. As shown by sub-blocks 404 and 406, additional operations may be performed at block 402 with the motion control feature deactivated (or disabled).

At sub-block 404, one or more processors of the handheld controller 100 may receive motion sensor data from a motion sensor(s) of the handheld controller 100 in response to movement of the handheld controller 100. For example, a motion sensor(s) (e.g., a gyroscope, accelerometer, a combination thereof, etc.) may be configured to provide motion sensor data to the processor(s) indicative of movement of the handheld controller 100. This is described in more detail below with reference to FIG. 8.

At sub-block 406, logic of the handheld controller 100 may refrain from sending the motion sensor data to an application (e.g., a video game) as application input (e.g., video game input). That is, when the motion control feature is deactivated at block 402, motion sensor data generated by the motion sensor(s) of the handheld controller 100 may be ignored. In some embodiments, the motion sensor(s) may be disabled altogether at block 402, such as by cutting off a power supply to the motion sensor(s) as a means of disabling or deactivating the motion control feature. In some embodiments, the motion sensor data may be sent, but ignored on the receiving end.

At 408, the logic of the handheld controller 100 may determine, based at least in part on touch sensor data provided by a touch sensor associated with the movable (or non-movable) control, whether a finger is contacting a surface (e.g., a distal surface) of the movable (or non-movable) control. For example, a touch sensor 308 implemented in a joystick 112(2) may generate touch sensor data indicative of a finger 102 contacting the surface 104 of the joystick 112(2) at block 408. If it is determined that a finger is not contacting the surface of the movable (or non-movable) control at block 408, the process 400 may follow the "NO" route from block 408 back to block 402 where the motion control feature remains deactivated (disabled). If, at block 408, it is determined that a finger 102 is contacting the surface of the movable (or non-movable) control, the process 400 may follow the "YES" route from block 408 to block 410.

At 410, the logic of the handheld controller 100 may activate the motion control feature, whereby motion sensor data is sent to the application (e.g., the video game) as application input (e.g., video game input). This is shown by sub-blocks 412-418.

At sub-block 412, one or more processors of the handheld controller 100 may receive motion sensor data from a motion sensor(s) of the handheld controller 100 in response to movement of the handheld controller 100. For instance, the user might move the handheld controller 100 in a rightward motion, as shown in FIG. 2A while the finger 102 is contacting the surface 104 of the movable (or non-movable) control, as determined at block 408.

At sub-block 414, the logic of the handheld controller 100 may send the motion sensor data to an application, such as a video game, as application input (e.g., video game input) to control an aspect of the application. Again, the sending of the motion sensor data to the application is based at least in part on determining, at block 408, that that the finger is contacting the surface of the movable (or non-movable)

control (e.g., the surface 104 of the joystick 112(2)). Otherwise, if the finger contact is ceased, the motion control feature is deactivated.

At sub-block 415, the motion sensor data may be used to control movement of a cursor (e.g., a pointer) of the application (e.g., the video game). For example, the user can move the handheld controller 100 to control movement of an on-screen pointer that moves around the screen as the controller 100 is moved about a physical space.

At sub-block 416, the motion sensor data may be used to control movement of a virtual camera of the application (e.g., the video game). For example, the user can move the handheld controller 100 to control movement of a virtual camera, such as the scene of a first-person shooter game that represents what a player-controlled character sees within a virtual game world.

At sub-block 418, the motion sensor data may be used to control movement of a virtual object of the application (e.g., the video game). For example, the user can move the handheld controller 100 to control the movement of a virtual race car, a virtual character, or any other object that may be movable (or non-movable) within a virtual game world.

At 420, the logic of the handheld controller 100 may determine, based at least in part on the touch sensor data provided by the touch sensor associated with the movable (or non-movable) control, whether the finger 102 has ceased contacting the surface of the movable (or non-movable) control. For example, a touch sensor 308 implemented in a joystick 112(2) may generate touch sensor data indicative of a finger 102 ceasing to contact the surface 104 of the joystick 112(2) at block 420. If it is determined that a finger is still contacting the surface of the movable (or non-movable) control at block 420, the process 400 may follow the "NO" route from block 420 back to block 410 where the motion control feature remains activated (enabled). If, at block 420, it is determined that a finger 102 has ceased contacting the surface of the movable (or non-movable) control, the process 400 may follow the "YES" route from block 420 back to block 402, where the logic of the handheld controller 100 stops sending the motion sensor data to the application (e.g., the video game) as application input (e.g., video game input).

Accordingly, the process 400 illustrates a technique of toggling a motion control feature of a handheld controller 100 on and off via finger contact with a surface of a movable (or non-movable) control. As mentioned elsewhere herein, the configuration shown in FIG. 4 can be reversed such that the motion control feature is activated when the finger is not contacting the surface of the movable (or non-movable) control, and deactivated when the finger is contacting the surface of the movable (or non-movable) control.

Figure 5:
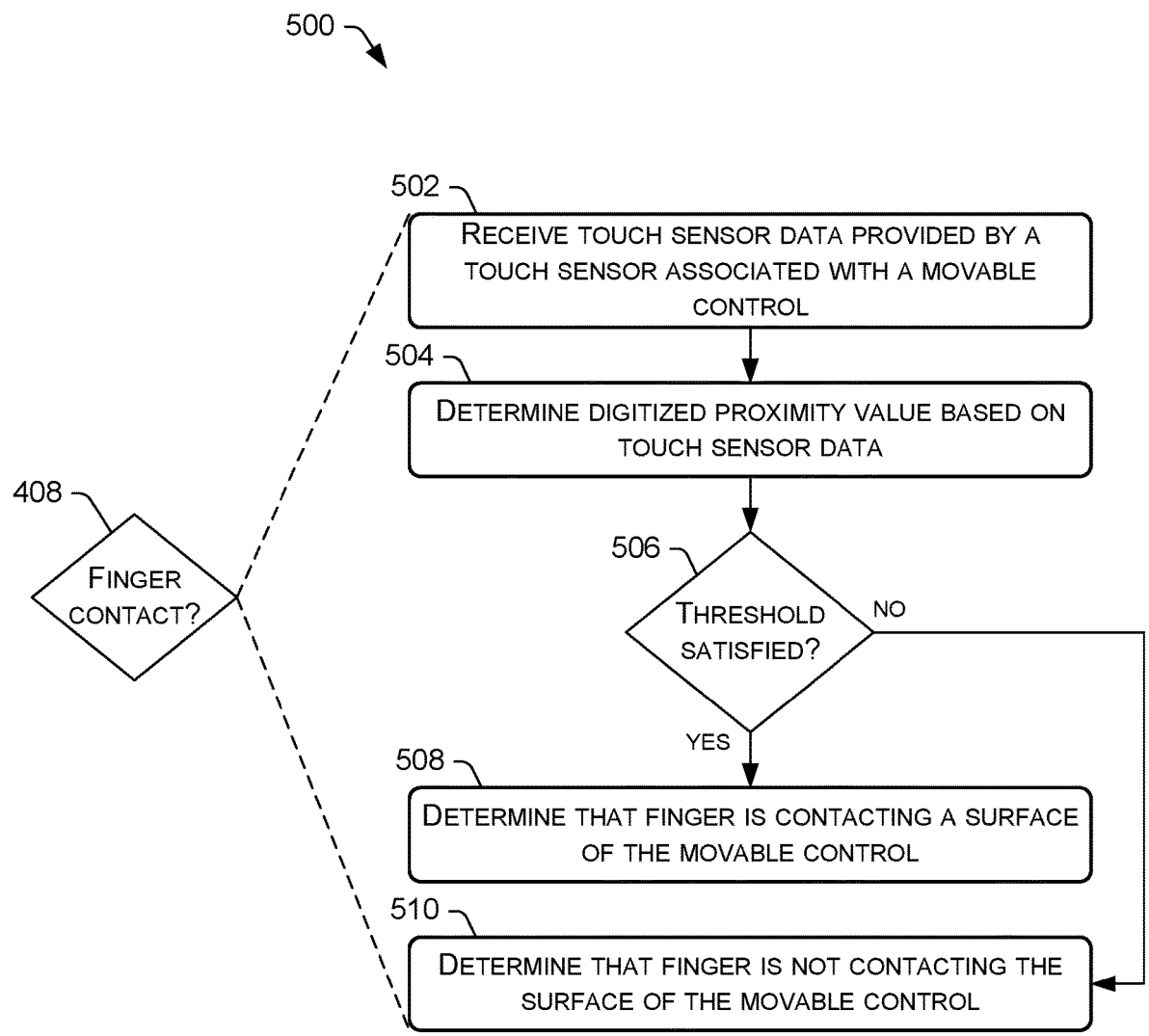
FIG. 5 is a flow diagram of an example process for detecting whether a finger is in contact with a surface of a movable (or non-movable) control using a touch sensor associated with the movable (or non-movable) control.

FIG. 5 is a flow diagram of an example process 500 for detecting whether a finger is in contact with a surface of a movable (or non-movable) control using a touch sensor associated with the movable (or non-movable) control. As indicated in FIG. 5, the process 500 may represent a sub-process of block 408 of the process 400. For discussion purposes, the process 500 is described with reference to the previous figures.

At 502, one or more processors of a handheld controller 100 may receive touch sensor data provided by a touch sensor associated with a movable control. The movable control may be included on a housing 106 of the handheld controller 100 and may be configured to be actuated by a finger moving the movable control from a first position to a second position. For example, the movable control may be a joystick 112(2) that is movable between a first position 304(1) and a second position 304(2), or between a first position 306(1) and a second position 306(2), as shown in FIG. 3, and the touch sensor 308 may be mounted to a surface (e.g., an inner surface) of the joystick 112(2), such as underneath a distal, outer surface 304 (e.g., under the cap of the joystick 112(2)). It is to be appreciated that the process 500 may also be implemented with a non-movable control (e.g., a trackpad) that does not move between multiple positions. This non-movable control may be associated with a touch sensor to detect the presence or absence of a finger on the surface of the non-movable control.

At 504, logic of the handheld controller 100 may determine a digitized proximity value based at least in part on the touch sensor data. For example, with a capacitive-based touch sensor 308, the digitized proximity value may be a digitized capacitance value, which may be in arbitrary units, and which may be indicative of a proximity of a finger relative to a surface of the movable (or non-movable) control.

At 506, the logic of the handheld controller 100 may determine whether the digitized proximity value satisfies (e.g., exceeds) a threshold value indicative of a finger 102 contacting a surface of the movable (or non-movable) control. For example, with a capacitive-based touch sensor 308, digitized capacitance values may range from 0 when a finger is beyond a threshold distance from the movable (or non-movable) control (or outside of a range of detection of the touch sensor 308) to roughly 1000 when the finger is contacting a surface of the movable (or non-movable) control. Thus, a threshold value may be set to a value slightly below this value of 1000 to determine when the finger is likely contacting the surface of the movable (or non-movable) control.

If the threshold is satisfied at block 506 (e.g., if the digitized proximity value determined at block 504 exceeds the threshold value), the process 500 may follow the "YES" route from block 506 to block 508 where the logic determines that the finger is contacting the surface of the movable (or non-movable) control. Otherwise, if the threshold is not satisfied at block 506 (e.g., if the digitized proximity value determined at block 504 does not exceed (e.g., is less than or equal to) the threshold value), the process 500 may follow the "NO" route from block 506 to block 510 where the logic determines that the finger is not contacting the surface of the movable (or non-movable) control.

Figure 6:
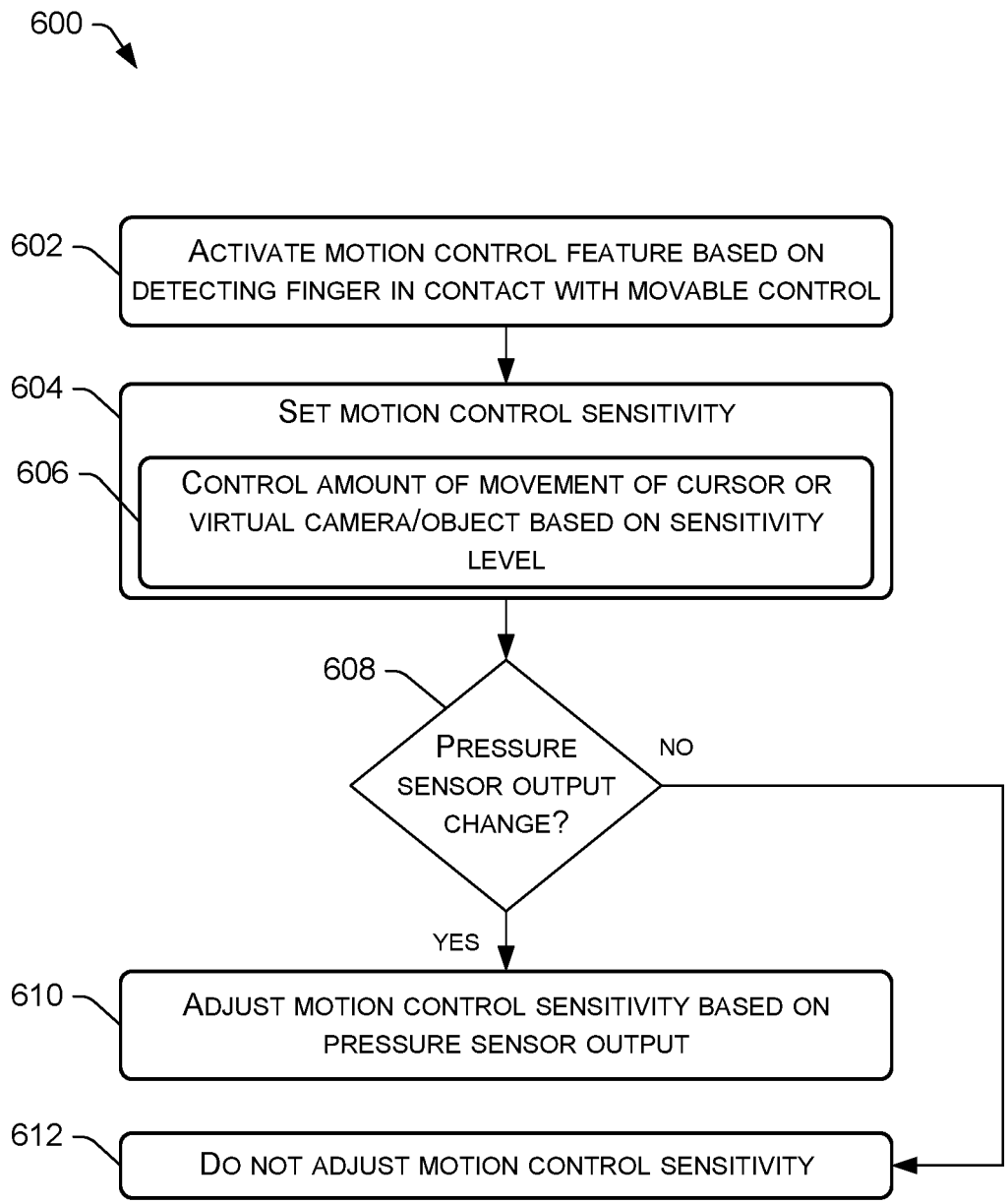
FIG. 6 is a flow diagram of an example process for adjusting the sensitivity of a motion control feature based on output of a pressure sensor associated with a movable (or non-movable) control of a handheld controller.

FIG. 6 is a flow diagram of an example process 600 for adjusting the sensitivity of a motion control feature based on output of a pressure sensor associated with a movable (or non-movable) control of a handheld controller 100. For discussion purposes, the process 600 is described with reference to the previous figures.

At 602, logic of a handheld controller 100 may activate a motion control feature of the handheld controller 100 based at least in part on detecting a finger in contact with a surface of a movable (or non-movable) control. For example, block 602 may include operations described with reference to blocks 408 and 410 of the process 400 to activate a motion control feature of the handheld controller 100.

At 604, a sensitivity level of the motion control feature may be set to a first sensitivity level. This first sensitivity level may be a default sensitivity level that corresponds to a state where the finger 102 is contacting a surface of the movable (or non-movable) control without pressing upon the movable (or non-movable) control. For example, at block 604, a pressure sensor 312 (e.g., a FSR) associated with the movable (or non-movable) control may provide force data that is digitized to a value that does not exceed a threshold indicative of a finger pressing upon the movable (or non-movable) control.

At sub-block 606, the logic of the handheld controller 100 may adjust (or control) an amount of movement of a cursor, a virtual camera, or a virtual object of an application (e.g., a video game) based on the first sensitivity level. In some embodiments, since the first sensitivity level is based on a value corresponding to an amount of force of a press on the movable (or non-movable) control, the amount of movement of the cursor, the virtual camera, or the virtual object of the application (e.g., the video game) may be adjusted (or controlled) based at least in part on the value from the pressure sensor 312 (e.g., a FSR value from a FSR). The first sensitivity level may, for example, cause the virtual camera/object to move by a particular amount proportional to an amount of movement of the handheld controller 100 (e.g., a 30 degree rotation of the handheld controller 100 may map to a 30 degree rotation of the cursor or the virtual camera/object of the application, such as a video game).

At 608, the logic of the handheld controller 100 may determine whether there has been a change in the pressure sensor output. For example, the pressure sensor 312 associated with the movable (or non-movable) control may provide force data indicative of an amount of force of a press of the movable (or non-movable) control when the user presses harder upon the movable (or non-movable) control. In this scenario, if the user presses upon the movable (or non-movable) control, a change in pressure sensor output is detected, and the process 600 follows the "YES" route from block 608 to block 610, where the sensitivity level of the motion control feature is adjusted based on the pressure sensor output. For example, the logic of the handheld controller 100 may determine a value (e.g., a FSR value) corresponding to an amount of force of a press of the movable (or non-movable) control, and may, at block 610, set the sensitivity level of the motion control feature to a second sensitivity level whereby an amount of movement of the virtual camera or the virtual object is adjusted (increased or decreased) based on change from the first sensitivity level to the second sensitivity level. For example, the same amount of movement of the handheld controller 100 (e.g., a 30 degree rotation) may map to a 15 degree rotation of the virtual camera/object, or to a 45 degree rotation of the virtual camera/object.

If, at 608, the logic of the handheld controller 100 determines that the pressure sensor output has not changed, the process 600 may follow the "NO" route from block 608 to block 612 where the sensitivity level of the motion control feature is not adjusted. That is, if the user initially contacts the movable (or non-movable) control without pressing upon the movable (or non-movable) control, the pressure sensor output remains constant, and the sensitivity level of the motion control feature remains unchanged. In this manner, the user can control the amount of movement of the cursor, the virtual camera, or the virtual object of an application, such as a video game, by pressing on the movable (or non-movable) control with variable force.

Figure 7:
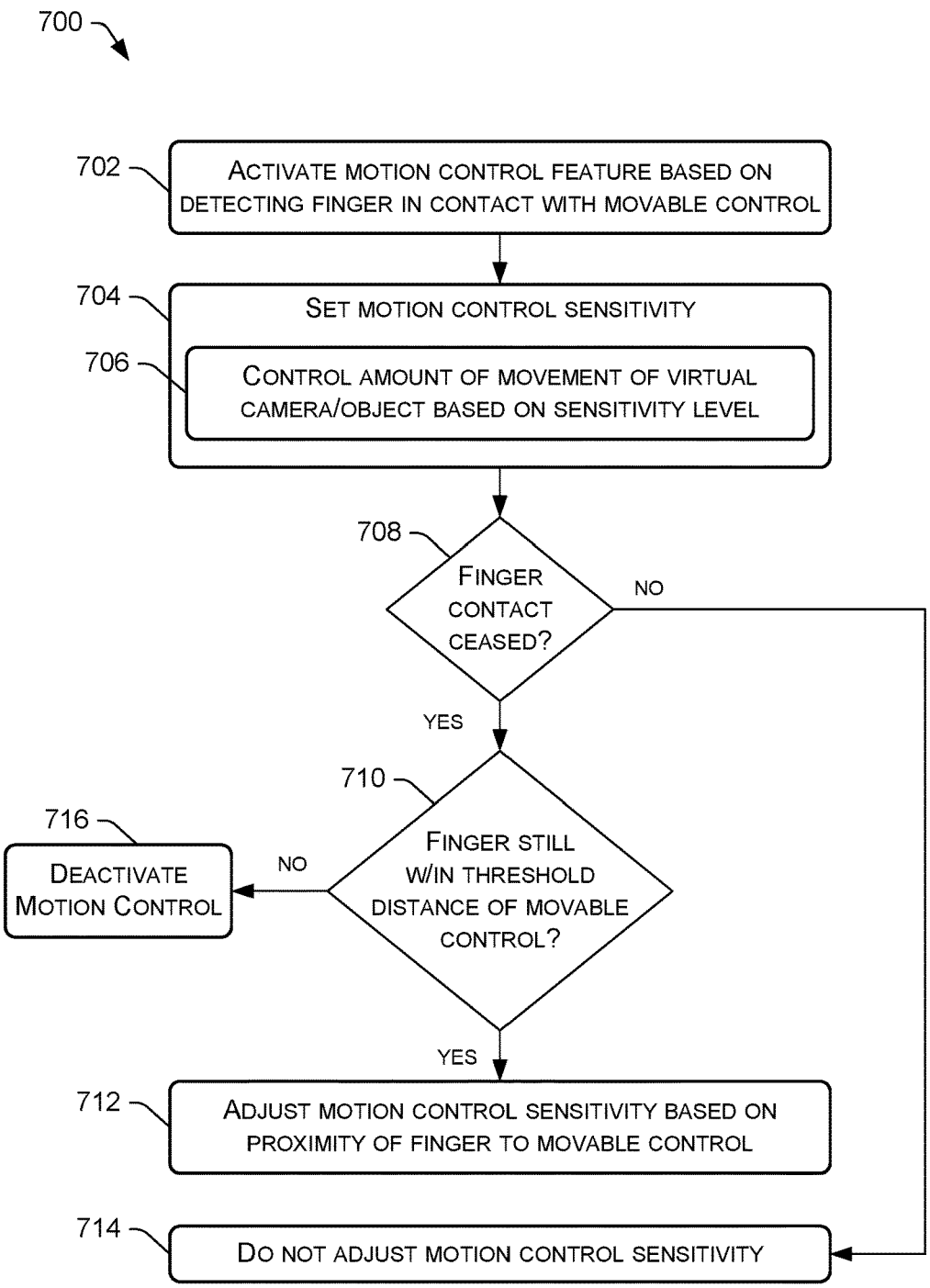
FIG. 7 is a flow diagram of an example process for adjusting the sensitivity of a motion control feature based on output of a touch sensor associated with a movable (or non-movable) control of a handheld controller.

FIG. 7 is a flow diagram of an example process 700 for adjusting the sensitivity of a motion control feature based on output of a touch sensor associated with a movable (or non-movable) control of a handheld controller 100. For discussion purposes, the process 700 is described with reference to the previous figures.

At 702, logic of a handheld controller 100 may activate a motion control feature of the handheld controller 100 based at least in part on detecting a finger in contact with a surface of a movable (or non-movable) control. For example, block 702 may include operations described with reference to blocks 408 and 410 of the process 400 to activate a motion control feature of the handheld controller 100.

At 704, a sensitivity level of the motion control feature may be set to a first sensitivity level. This first sensitivity level may be a default sensitivity level that corresponds to a state where the finger 102 is contacting a surface of the movable (or non-movable) control. For example, at block 704, a touch sensor 308 associated with the movable (or non-movable) control may provide touch sensor data that is digitized to a value that exceeds a threshold value indicative of a finger contacting a surface of the movable (or non-movable) control.

At sub-block 706, the logic of the handheld controller 100 may adjust (or control) an amount of movement of a cursor, a virtual camera, or a virtual object of an application, such as a video game, based on the first sensitivity level. In some embodiments, since the first sensitivity level is based on a proximity value corresponding to a finger contacting the surface of the movable (or non-movable) control, the amount of movement of the cursor, the virtual camera, or the virtual object of the application (e.g., the video game) may be adjusted (or controlled) based at least in part on the proximity value from the touch sensor 308. The first sensitivity level may, for example, cause the virtual camera/object to move by a particular amount proportional to an amount of movement of the handheld controller 100 (e.g., a 30 degree rotation of the handheld controller 100 may map to a 30 degree rotation of the cursor or the virtual camera/object of the application, such as a video game).

At 708, the logic of the handheld controller 100 may determine whether the finger 102 has ceased contacting the surface of the movable (or non-movable) control. For example, the touch sensor 308 associated with the movable (or non-movable) control may provide touch sensor data indicative of the finger 102 ceasing contact with the surface of the movable (or non-movable) control when the user lifts the finger 102 off of the movable (or non-movable) control. In this scenario, if the user lifts the finger 102 off of the surface of the movable (or non-movable) control, a change in touch sensor output is detected, and the process 700 follows the "YES" route from block 708 to block 710, where the logic determines, based on the touch sensor data, whether the finger is still spaced a distance from the surface of the movable (or non-movable) control that is less than a threshold distance. For example, this finger spacing from the movable (or non-movable) control may map to a range of proximity values measurable by the touch sensor 308, and so long as the touch sensor data is converted to proximity values within this range, the logic may deduce that the finger 102 has not moved beyond a threshold distance that is, for example, outside of a detection range of the touch sensor 308. If the finger 102 is still within the threshold distance from the surface of the movable (or non-movable) control, the process 700 may follow the "YES" route from block 710 to block 712.

At 712, the sensitivity level of the motion control feature is adjusted based on the touch sensor 308 output indicating that the finger 102 has moved from contacting the surface of the movable (or non-movable) control to a distance from the surface that is still within the threshold distance. For example, the logic of the handheld controller 100 may determine a value (e.g., a proximity value) corresponding to the finger 102 being spaced a distance from the surface of the movable (or non-movable) control that is less than a threshold distance, and may, at block 712, set the sensitivity level of the motion control feature to a second sensitivity level whereby an amount of movement of the virtual camera or the virtual object is adjusted (increased or decreased) based on change from the first sensitivity level to the second sensitivity level. For example, the same amount of movement of the handheld controller 100 (e.g., a 30 degree rotation) may map to a 15 degree rotation of the virtual camera/object, or to a 45 degree rotation of the virtual camera/object.

If, at 708, the logic of the handheld controller 100 determines that the finger 102 is still contacting the surface of the movable (or non-movable) control, the process 700 may follow the "NO" route from block 708 to block 714 where the sensitivity level of the motion control feature is not adjusted. That is, if the user initially contacts the movable (or non-movable) control and does not lift the finger 102 off of the movable (or non-movable) control, the touch sensor 308 output remains constant, and the sensitivity level of the motion control feature remains unchanged. In this manner, the user can control the amount of movement of the cursor, the virtual camera, or the virtual object of an application, such as a video game, by lifting his/her finger off of the movable (or non-movable) control slightly and varying the distance of the finger 102 from the surface of the movable (or non-movable) control while keeping the finger within a detection range of the touch sensor 308. However, at block 710, if the touch sensor data indicates that the finger has moved beyond the threshold distance (e.g., a digitized proximity value at block 710 is below a threshold value), the process 700 may follow the "NO" route from block 710 to block 716, where the motion control feature may be deactivated.

It is to be appreciated that while the processes described herein describe example operations, other implementations may include additional and/or alternative operations. Further, the order in which these operations are described is not limiting and the components may be arranged and/or assembled in any other similar or different manner. In addition, while the processes describe several components of a handheld controller, it is to be appreciated that the handheld controller may include additional and/or alternative components.

Figure 8:
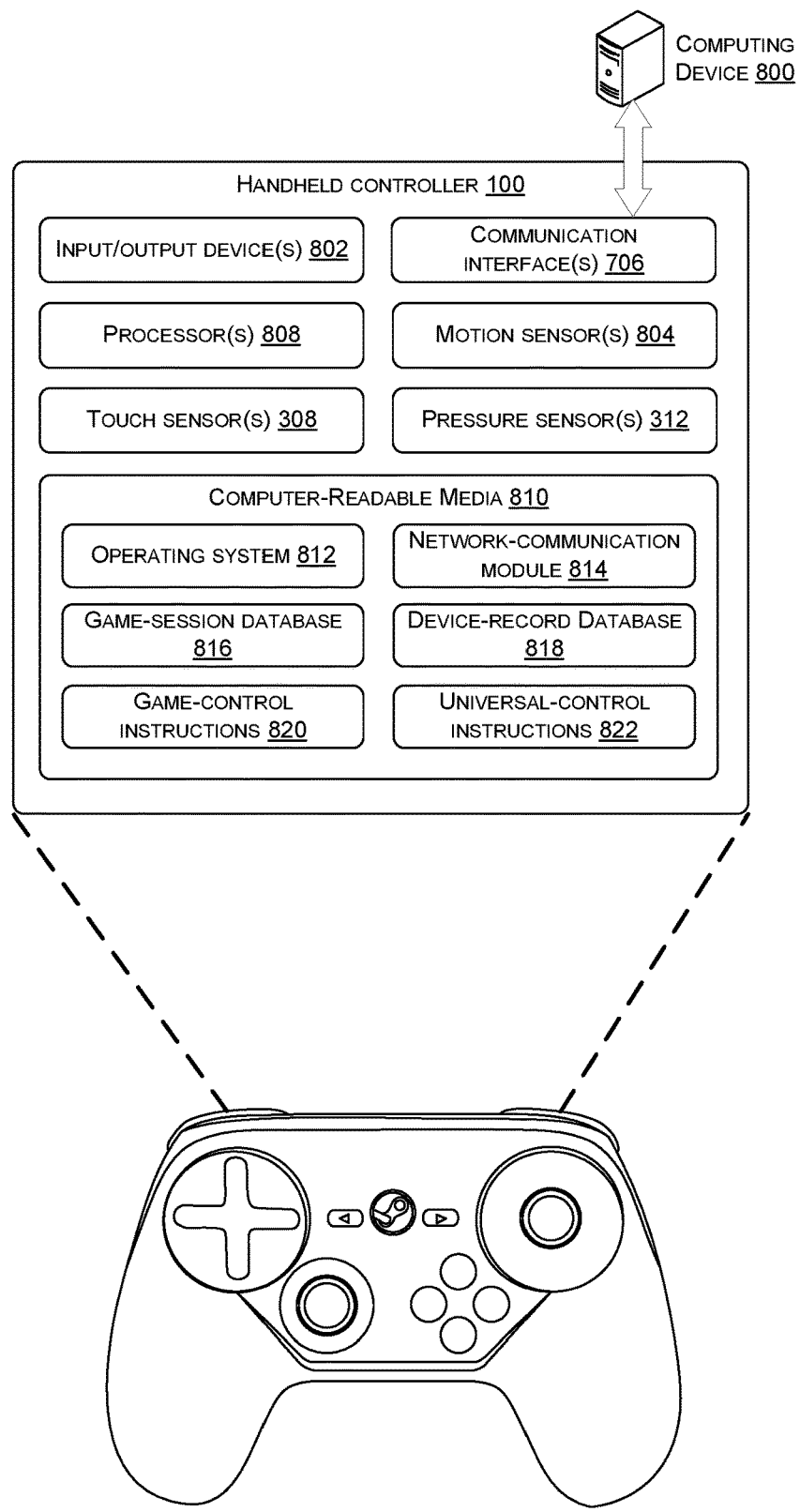
FIG. 8 illustrates example components of a handheld controller, such as the controller of FIG. 1, as well as a computing device with which the handheld controller is configured to communicate.

FIG. 8 illustrates example components of a handheld controller, such as the controller 100 of FIG. 1, as well as a computing device 800 with which the handheld controller 100 is configured to communicate. As illustrated, the handheld controller 100 includes one or more input/output (I/O) devices 802, such as the controls described above (e.g., joysticks, trackpads, triggers, depressible buttons, etc.), potentially any other type of input or output devices. For example, the I/O devices 802 may include one or more microphones to receive audio input, such as user voice input. In some implementations, one or more cameras or other types of sensors (e.g., a motion sensor(s) 804) may function as input devices to receive gestural input, such as motion of the handheld controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller may additionally or alternatively comprise any other type of output device.

In some instances, output by the one or more output devices may be based on input received by one or more of the input devices. For example, actuation of a control may result in the output of a haptic response by a vibrator located adjacent (e.g., underneath) the control or at any other location. In some instances, the output may vary based at least in part on a characteristic of a touch input on a touch sensor 308, such as the touch sensor 308 associated with the movable control, as described herein. For example, a touch input at a first location on the touch sensor 308 may result in a first haptic output, while a touch input at a second location on the touch sensor 308 may result in a second haptic output. Furthermore, a particular gesture on the touch sensor 308 may result in a particular haptic output (or other type of output). For instance, a swipe gesture on a control may result in a first type of haptic output, while a tap on the control (detected by the touch sensor 308) may result in a second type of haptic output, while a hard press of the control may result in a third type of haptic output.

In addition, the handheld controller 100 may include one or more communication interfaces 706 to facilitate a wireless connection to a network and/or to one or more remote systems (e.g., a host computing device 800 executing an application, a game console, etc.). The communication interfaces 706 may implement one or more of various wireless technologies, such as Wi-Fi, Bluetooth, radio frequency (RF), and so on. It is to be appreciated that the handheld controller 100 may further include physical ports to facilitate a wired connection to a network, a connected peripheral device, or a plug-in network device that communicates with other wireless networks.

In the illustrated implementation, the handheld controller further includes one or more processors 808 and computer-readable media 810. In some implementations, the processors(s) 808 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 808 may possess its own local memory, which also may store program modules, program data, and/or one or more operating systems.

The computer-readable media 810 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media ("CRSM"), which may be any available physical media accessible by the processor(s) 808 to execute instructions stored on the computer-readable media 810. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 808.

Several modules such as instruction, datastores, and so forth may be stored within the computer-readable media 810 and configured to execute on the processor(s) 808. A few example functional modules are shown as stored in the computer-readable media 810 and executed on the processor(s) 808, although the same functionality may alternatively be implemented in hardware, firmware, or as a system on a chip (SOC).

An operating system module 812 may be configured to manage hardware within and coupled to the handheld controller 100 for the benefit of other modules. In addition, the computer-readable media 810 may store a network-communications module 814 that enables the handheld controller 100 to communicate, via the communication interfaces 706, with one or more other devices, such as a computing device 800 (e.g., a PC) executing an application (e.g., a game application), a game console, a remote server, or the like. The computer-readable media 810 may further include a game-session database 816 to store data associated with a game (or other application) executing on the handheld controller or on a computing device to which the handheld controller 100 couples. The computer-readable media 810 may also include a device-record database 818 that stores data associated with devices to which the handheld controller 100 couples, such as the computing device 800 (e.g., a PC, game console, remote server or the like). The computer-readable media 810 may further store game-control instructions 820 that configure the handheld controller 100 to function as a gaming controller, and universal-control instructions 822 that configure the handheld controller 100 to function as a controller of other, non-gaming devices.

As mentioned elsewhere, the touch sensor(s) 308 can be based on any suitable touch-sensing technologies, such as a capacitive touch sensor, a resistive touch sensor, an infrared touch sensor, a touch sensor that utilizes acoustic soundwaves to detect a proximity of a finger 102, or any other type of touch sensor 308. The touch sensor 308 may represent a touch sensor associated with a movable control, such as the joystick 112(2) described herein. However, the handheld controller 100 may include multiple touch sensors, such as additional touch sensors associated with additional controls, including touch sensors for trackpads, etc. In implementations that utilize capacitive-based sensing, the touch sensor 308 may include electrodes (e.g., a transmitter electrode and a receiver electrode of a transcapacitive-type sensor), and voltage can be applied to the electrodes so that the electrodes are configured to measure capacitance changes at the electrodes, which can be translated into touch sensor data. Capacitance changes at the electrodes of the touch sensor 308 may be influenced by an object (such as the finger 102) that is in proximity to the electrodes. The raw capacitance can be digitized into proximity values processable by logic of the handheld controller 100.

The pressure sensor(s) 312 may include a FSR(s) with a conductive material spaced from a resistive membrane (e.g., a semiconductive material, such as an ink composition), as well as an actuator that is configured to convey a force onto the resistive membrane so that the resistive material contacts the conductive material under the application of a compressive force applied to the actuator. The FSR may exhibit varying resistance in response to variable forces. The FSR can be a "ShuntMode" FSR or a "ThruMode" FSR. With a ShuntMode FSR, the conductive material spaced from the resistive membrane may be a plurality of interdigitated metal fingers. When a force is applied to the actuator of the FSR, the resistive membrane contacts some of the interdigitated metal fingers, which shunts the metal fingers, thereby varying the resistance across the output terminals of the FSR, which can be digitized into a FSR value processable by logic of the handheld controller 100. The pressure sensor(s) 312 may additionally, or alternatively, include other types of pressure sensing mechanisms, such as piezoelectric sensors, strain gauges, and the like.

The motion sensor(s) 804 may be implemented as an inertial measurement unit (IMU) including one or more gyroscopes, and/or accelerometers, and/or magnetometers, and/or compasses, or any other suitable motion sensor. In some embodiments, motion sensor(s) 804 may be implemented, at least in part, as a camera or 3D sensor configured used for feature tracking, and so on. In some embodiments, the motion sensor(s) 804 can be implemented using multiple markers on an exterior of the housing 106 of the handheld controller 100 such as reflectors or lights (e.g., infrared or visible light) that, when viewed by an external camera or illuminated by a light (e.g., infrared or visible light), may provide one or more points of reference for interpretation by software in order to generate motion, position, and orientation data. For instance, the handheld controller 100 may include light sensors that are sensitive to light (e.g., infrared or visible light) that is projected or broadcast by base stations in the environment of the handheld controller 100. In some embodiments, the motion sensor(s) 804 may be utilized for obtaining motion sensor data by providing six-component motion sensing. That is, the motion sensor(s) 804 may be configured to sense and generate the motion sensor data in the form of translational and/or rotational movement about a 3D space. The motion sensor(s) 804 may be configured to measure and generate data relating to the extent, rate, and/or acceleration of translational movement in 3D space (X, Y, and Z movement), as well as the extent, rate, and/or acceleration of rotation in 3D space (roll, pitch, and yaw). Measurements may be generated in terms of a 3D coordinate system, such as Cartesian (X, Y, and Z) or spherical coordinate systems. The motion sensor data may include measurements in terms of displacement (e.g., displacement since the preceding time log), velocity, and/or acceleration of translational movement (denoted by variables: d, v, a) and angular movement (denoted by variables: $\theta$, $\omega$, $\alpha$). The motion sensor data may further include times at which motion sensor data is collected at any suitable time interval so that a history of motion sensor data is collected and temporarily, or permanently, stored.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A handheld controller comprising:
one or more processors;
a motion sensor configured to provide, to the one or more processors, motion sensor data indicative of movement of the handheld controller;

a housing having a front surface;
a joystick disposed on the front surface of the housing and configured to be actuated by a thumb moving the joystick from a first position to a second position;
a touch sensor associated with the joystick and configured to provide, to the one or more processors, touch sensor data indicative of a proximity of the thumb relative to a distal surface of the joystick; and
logic configured to:
  receive the touch sensor data;
  determine a first digitized proximity value based at least in part on the touch sensor data;
  determine, that the first digitized proximity value exceeds a threshold value indicative of the thumb contacting the distal surface of the joystick;
  receive the motion sensor data;
  determine, based at least in part on the motion sensor data, that the handheld controller has moved;
  send, based at least in part on determining that the first digitized proximity value exceeds the threshold value, the motion sensor data to an application as application input to control an aspect of the application;
  determine a second digitized proximity value based at least in part on the touch sensor data;
  determine that the second digitized proximity value does not exceed the threshold value indicative of the thumb having ceased contacting the distal surface of the joystick; and
  stop sending the motion sensor data to the application as the application input based at least in part on determining that the second digitized proximity value does not exceed the threshold value.

2. The handheld controller of claim 1, wherein the touch sensor comprises a capacitive sensor configured to measure capacitance values based on the proximity of the thumb relative to the distal surface of the joystick.

3. The handheld controller of claim 1, wherein:
the front surface of the housing includes a first region left of center of the handheld controller and a second region right of center of the handheld controller; and
the joystick is disposed on the front surface of the housing within the second region.

4. The handheld controller of claim 1, wherein the aspect of the application comprises at least one of:
movement of a cursor of the application;
movement of a virtual camera of the application, wherein movement of the virtual camera changes a scene that is presented on a display; or
movement of a virtual object of the application.

5. The handheld controller of claim 4, further comprising:
a pressure sensor associated with the joystick and configured to provide, to the one or more processors, force data indicative of an amount of force of a press of the joystick,
wherein the logic is further configured to:
  determine a value corresponding to the amount of force of the press of the joystick; and
  adjust an amount of at least one of the movement of the virtual camera or the movement of the virtual object based at least in part on the value.

6. A handheld controller comprising:
one or more processors;
a motion sensor configured to provide, to the one or more processors, motion sensor data indicative of movement of the handheld controller;
a housing including a movable control that is configured to be actuated by a finger moving the movable control from a first position to a second position;
a touch sensor associated with the movable control and configured to provide, to the one or more processors, touch sensor data indicative of a proximity of the finger relative to the movable control; and
logic configured to:
  receive the touch sensor data;
  determine a first digitized proximity value based at least in part on the touch sensor data;
  determine that the first digitized proximity value exceeds a threshold value indicative of the finger contacting a surface of the movable control;
  receive the motion sensor data;
  determine, based at least in part on the motion sensor data, that the handheld controller has moved;
  send the motion sensor data to an application as application input to control an aspect of the application based at least in part on determining that the first digitized proximity value exceeds the threshold value;
  determine a second digitized proximity value based at least in part on the touch sensor data;
  determine that the second digitized proximity value does not exceed the threshold value indicative of the finger having ceased contacting the surface of the movable control; and
  stop sending the motion sensor data to the application as the application input based at least in part on determining that the second digitized proximity value does not exceed the threshold value.

7. The handheld controller of claim 6, wherein the movable control comprises a joystick disposed on a front surface of the housing.

8. The handheld controller of claim 6, wherein the touch sensor comprises a capacitive sensor configured to measure capacitance values based on the proximity of the finger relative to the movable control.

9. The handheld controller of claim 6, wherein the application input is first application input, and wherein the logic is further configured to:
determine that the finger has actuated the movable control by moving the movable control from the first position to the second position; and
send actuation data to the application as second application input to control the aspect, or a different aspect, of the application, wherein the actuation data is generated based on the finger having actuated the movable control.

10. The handheld controller of claim 6, wherein:
a front surface of the housing includes a first region left of center of the handheld controller and a second region right of center of the handheld controller; and
the movable control is disposed on the front surface of the housing within the first region.

11. The handheld controller of claim 6, wherein the aspect of the application comprises at least one of:
movement of a cursor of the application;
movement of a virtual camera of the application; or
movement of a virtual object of the application.

12. The handheld controller of claim 11, wherein the logic is further configured to:
determine, based at least in part on the touch sensor data, that the finger has ceased contacting the surface of the movable control and is spaced a distance from the surface of the movable control that is less than a threshold distance; and adjust an amount of at least one of the movement of the virtual camera or the movement of the virtual object based at least in part on the distance the finger is spaced from the surface of the movable control.

13. The handheld controller of claim 11, further comprising:

a pressure sensor associated with the movable control and configured to provide, to the one or more processors, force data indicative of an amount of force of a press of the movable control, wherein the logic is further configured to:
determine a value corresponding to the amount of force of the press of the movable control; and
adjust an amount of at least one of the movement of the virtual camera or the movement of the virtual object based at least in part on the value.

14. A computer-implemented method comprising:

receiving, by one or more processors of a handheld controller, touch sensor data provided by a touch sensor associated with a movable control included on a housing of the handheld controller, wherein the movable control is configured to be actuated by a finger moving the movable control from a first position to a second position;

determining a first digitized proximity value based at least in part on the touch sensor data;

determining that the first digitized proximity value exceeds a threshold value indicative of the finger contacting a surface of the movable control;

receiving, by the one or more processors, motion sensor data provided by a motion sensor of the handheld controller;

determining, based at least in part on the motion sensor data, that the handheld controller has moved;

sending the motion sensor data to an application as application input to control an aspect of the application based at least in part on determining that the first digitized proximity value exceeds the threshold value;

determining a second digitized proximity value based at least in part on the touch sensor data;

determining that the second digitized proximity value does not exceed the threshold value indicative of the finger having ceased contacting the surface of the movable control; and stop sending the motion sensor data to the application as the application input based at least in part on determining that the second digitized proximity value does not exceed the threshold value.

15. The computer-implemented method of claim 14, wherein the movable control comprises a joystick disposed on a front surface of the housing.

16. The computer-implemented method of claim 14, wherein:

a front surface of the housing includes a first region left of center of the handheld controller and a second region right of center of the handheld controller; and
the movable control is disposed on the front surface of the housing within the second region.

17. The computer-implemented method of claim 14, wherein the touch sensor comprises a capacitive sensor configured to measure capacitance values based on the proximity of the finger relative to the movable control.

18. The computer-implemented method of claim 14, wherein the aspect of the application comprises at least one of:

movement of a cursor of the application;
movement of a virtual camera of the application; or
movement of a virtual object of the application.

19. The computer-implemented method of claim 18, further comprising:

determining, based at least in part on the touch sensor data provided by the touch sensor, that the finger has ceased contacting the surface of the movable control and is spaced a distance from the surface of the movable control that is less than a threshold distance; and
adjusting an amount of at least one of the movement of the virtual camera or the movement of the virtual object based at least in part on the determining that the finger is spaced the distance from the surface of the movable control that is less than the threshold distance.

20. The computer-implemented method of claim 18, further comprising:

determining a value corresponding to an amount of force of a press of the movable control based at least in part on force data provided by a pressure sensor associated with the movable control; and
adjusting an amount of at least one of the movement of the virtual camera or the movement of the virtual object based at least in part on the value.

* * * * *